US010133344B2

(12) United States Patent
Saito

(10) Patent No.: US 10,133,344 B2
(45) Date of Patent: Nov. 20, 2018

(54) HEAD MOUNTED DISPLAY APPARATUS

(71) Applicant: SEIKO EPSON CORPORATION, Tokyo (JP)

(72) Inventor: Hitoshi Saito, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/606,844

(22) Filed: May 26, 2017

(65) Prior Publication Data

US 2017/0262047 A1 Sep. 14, 2017

Related U.S. Application Data

(63) Continuation of application No. 14/466,179, filed on Aug. 22, 2014, now Pat. No. 9,690,371.

(30) Foreign Application Priority Data

Aug. 29, 2013 (JP) .................. 2013-177866

(51) Int. Cl.
G09G 5/00 (2006.01)
G06F 3/01 (2006.01)
G06T 19/00 (2011.01)
G02B 27/01 (2006.01)

(52) U.S. Cl.
CPC ............ *G06F 3/011* (2013.01); *G02B 27/017* (2013.01); *G02B 27/0172* (2013.01); *G06T 19/006* (2013.01); *G02B 2027/014* (2013.01); *G02B 2027/0138* (2013.01); *G02B 2027/0178* (2013.01); *G02B 2027/0187* (2013.01)

(58) Field of Classification Search
CPC ............ G06F 3/011; G02B 2027/0187; G02B 2027/0178; G02B 2027/014; G02B 2027/0138; G02B 27/0172; G06T 19/006
See application file for complete search history.

(56) References Cited

U.S. PATENT DOCUMENTS

| 2011/0157005 | A1 | 6/2011 | Inoue | |
|---|---|---|---|---|
| 2013/0342572 | A1* | 12/2013 | Poulos | G02B 27/017 345/633 |
| 2014/0152558 | A1* | 6/2014 | Salter | G06F 3/013 345/157 |
| 2014/0282162 | A1* | 9/2014 | Fein | G06F 3/0486 715/769 |

FOREIGN PATENT DOCUMENTS

| JP | 2010-146481 A | 7/2010 |
|---|---|---|
| JP | 2011-134054 A | 7/2011 |
| WO | 10/073928 A1 | 7/2010 |

OTHER PUBLICATIONS

Feb. 25, 2016 Office Action Issued in U.S. Appl. No. 14/466,179.
(Continued)

Primary Examiner — Amr A Awad
(74) Attorney, Agent, or Firm — Oliff PLC

(57) ABSTRACT

When a hand of the user is recognized in an image pickup region of a camera, a head mounted display monitors behavior of the hand in the image pickup region. When the hand of the user in the image pickup region reaches an outer peripheral region forming an outer periphery of the image pickup region, a notification is give to the user.

13 Claims, 17 Drawing Sheets

(56) References Cited

OTHER PUBLICATIONS

Sep. 6, 2016 Office Action issued in U.S. Appl. No. 14/466,179.
Lee et al., "Handy AR: Markerless Inspection of Augumented Reality Objects Using Fingertip Tracking," pp. 1-3, 2007.
Yuan et al., "Robust Hand Tracking Using a Simple Color Classification Technique," The International Journal of Virtual Reality, vol. 8 No. 2, pp. 7-12, 2009.

\* cited by examiner

HEAD MOUNTED DISPLAY APPARATUS

This is a Continuation of U.S. application Ser. No. 14/466,179 filed Aug. 22, 2014, which claims priority to Japanese Patent Application No. 2013-177866 filed Aug. 29, 2013. The disclosure of the prior application is hereby incorporated by reference herein in its entirety.

BACKGROUND

1. Technical Field

The present invention relates to a head mounted display apparatus.

2. Related Art

A technique called Augmented Reality (AR) for adding information to a real environment and presenting the information using a computer is known. A technique for realizing such augmented reality is applied to not only head mounted display (HMD) apparatuses (for example, refer to JP-A-2010-146481) but image processing devices (for example, refer to "Handy AR: Markerless Inspection of Augmented Reality Objects Using Fingertip Tracking") which display an image on the existing displays other than HMDs. The HMD disclosed in JP-A-2010-146481 allows the user to visually recognize a virtual panel formed by augmented reality as a virtual image, picks up images of a position and a movement of a hand of the user with a camera, and associates image pickup positions thereof with the virtual panel. Therefore, a technique for recognizing the hand of the user is necessary, and such hand recognition techniques are disclosed in "Handy AR: Markerless Inspection of Augmented Reality Objects Using Fingertip Tracking" and "The international Journal of Virtual Reality, 2009, 8(2): 7-12 Robust Hand Tracking Using a Simple Color Classification Technique".

For example, when a hand of the user is detected by a camera picking up an image thereof as disclosed in JP-A-2010-146481, currently, the user moves the hand based on past experience and a projected virtual image. Therefore, there is a problem in that an image of the hand which has been detected cannot be picked up by the user moving the hand. Therefore, in HMDs to which augmented reality (AR) is applied, it has been required that a hand of the user be continuously detected. In addition, improvement in the versatility of a technique for detecting a hand of the user, reduction in cost thereof, and the like have been also desired.

SUMMARY

An advantage of some aspects of the invention is to solve at least a part of the problems described above, and the invention can be implemented as the following forms.

(1) An aspect of the invention provides a head mounted display apparatus. In this head mounted display apparatus, a virtual image and an outside scene overlap each other and can be visually recognized by a user, the head mounted display apparatus including: an augmented-reality processing unit that generates image data for displaying the virtual image and allows the user to visually recognize the virtual image such that the virtual image is displayed in a visual field of the user based on the generated image data; a detecting unit that detects a hand of the user in a predetermined detection region for detecting the hand of the user and detects behavior of the hand of the user in the detection region; and a notifying unit that gives a notification to the user based on the behavior of the hand of the user detected by the detecting unit when the hand of the user reaches an outer peripheral region forming an outer periphery of the detection region.

In the head mounted display apparatus of this aspect of the invention, when the user moves and puts the hand into the detection region, and when the hand of the user is about to be moved from the detection region to the outside thereof, the notification is given to the user who moves the hand. The user who receives this notification can recognize that, if the hand is moved any further, the hand would deviate from the detection region. Therefore, the user can stop the movement of the hand or can return the hand to the detection region such that the hand is held in the detection region. As a result, according to the head mounted display apparatus with this configuration, once the hand of the user is detected, this detected state can be continued, which contributes to improvement of the detection accuracy of the hand.

(2) In the head mounted display apparatus according to the aspect of the invention described above, the augmented-reality processing unit may allow the user to visually recognize the virtual image in a display region corresponding to the detection region, and when the detecting unit detects the hand of the user in the detection region, the augmented-reality processing unit may generate the image data for displaying the virtual image, which is embedded with a partial hand image corresponding to at least a part of the detected hand of the user, and may update a position of the partial hand image in the display region of the virtual image based on a position of the part of the hand in the detection region. As a result, since the user can visually recognize the virtual image including the partial hand image, the user can recognize a correspondence between the hand of the user and the partial hand image of the virtual image.

(3) In the head mounted display apparatus according to any of the aspects of the invention described above, the augmented-reality processing unit may generate the image data for displaying the virtual image, which is embedded with a frame shape corresponding to the outer peripheral region forming the outer periphery of the detection region, to allow the user to visually recognize the virtual image. As a result, the position of the hand of the user in the detection region can be reliably recognized by the user. Therefore, the detected state of the hand of the user can be continued and the detection accuracy of the hand can be improved with high effectiveness.

(4) In the head mounted display apparatus according to any of the aspects of the invention described above, when the detecting unit detects the hand of the user in the detection region, the augmented-reality processing unit may generate the image data for displaying a detection-completed image, which indicates the completion of the detection of the hand of the user, as the virtual image or may generate the image data for displaying the virtual image, which is embedded with the detection-completed image, to allow the user to visually recognize the virtual image. As a result, when the hand is moved around its current position, the user can recognize that the hand is held in the detection region. Therefore, once the hand of the user is detected, this detected state can be continued, which contributes to improvement of the detection accuracy of the hand.

(5) In the head mounted display apparatus according to any of the aspects of the invention described above, the notifying unit may be configured to change a form of a notification to the user and, as the hand of the user in the detection region approaches the outer periphery of the outer periphery region, may give the notification to the user while changing the form of the notification. As a result, when the hand of the user in the detection region is moved outside the region, a change in the form of the notification can reliably allow the user to recognize this state and can urge the user to hold the hand in the detection region. Therefore, the detected state of the hand of the user can be continued and the detection accuracy of the hand can be improved with higher effectiveness.

(6) In the head mounted display apparatus according to any of the aspects of the invention described above, as the hand of the user in the detection region approaches the outer periphery of the outer periphery region, the notifying unit may emit a sound with a higher frequency or emits a sound with a higher volume to give the notification to the user. As a result, when the hand of the user in the detection region is moved outside the region, the sound can reliably allow the user to recognize this state and can urge the user to hold the hand in the detection region. Therefore, the detected state of the hand of the user can be continued and the detection accuracy of the hand can be improved with higher effectiveness.

All the above-described plural components included in each aspect of the invention are not essential. For a part of the plural components, modifications, deletions, substitutions with new components, and partial deletions of the limitations can be appropriately made to solve a part or all the above-described problems or to achieve a part or all the effects described in this specification. In addition, in order to solve a part or all the above-described problems or to achieve a part or all the effects described in this specification, an independent aspect of the invention can be made by combining a part or all of the technical features included in one aspect of the invention with a part or all of the technical features included in another aspect of the invention.

For example, one aspect of the invention can be implemented as a head mounted display apparatus and can also be implemented as another apparatus other than the head mounted display apparatus. A part or all the technical features of each configuration of the above-described head mounted display apparatus can be applied to this apparatus.

The invention can be implemented in various forms. For example, the invention can also be implemented in forms of a control method for the head mounted display apparatus, a head mounted display system, a computer program for implementing functions of the method, the apparatus, or the system, a recording medium on which the computer program is recorded, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. Embodiments

A-1. Configuration of Head Mounted Display Apparatus

Figure 1:
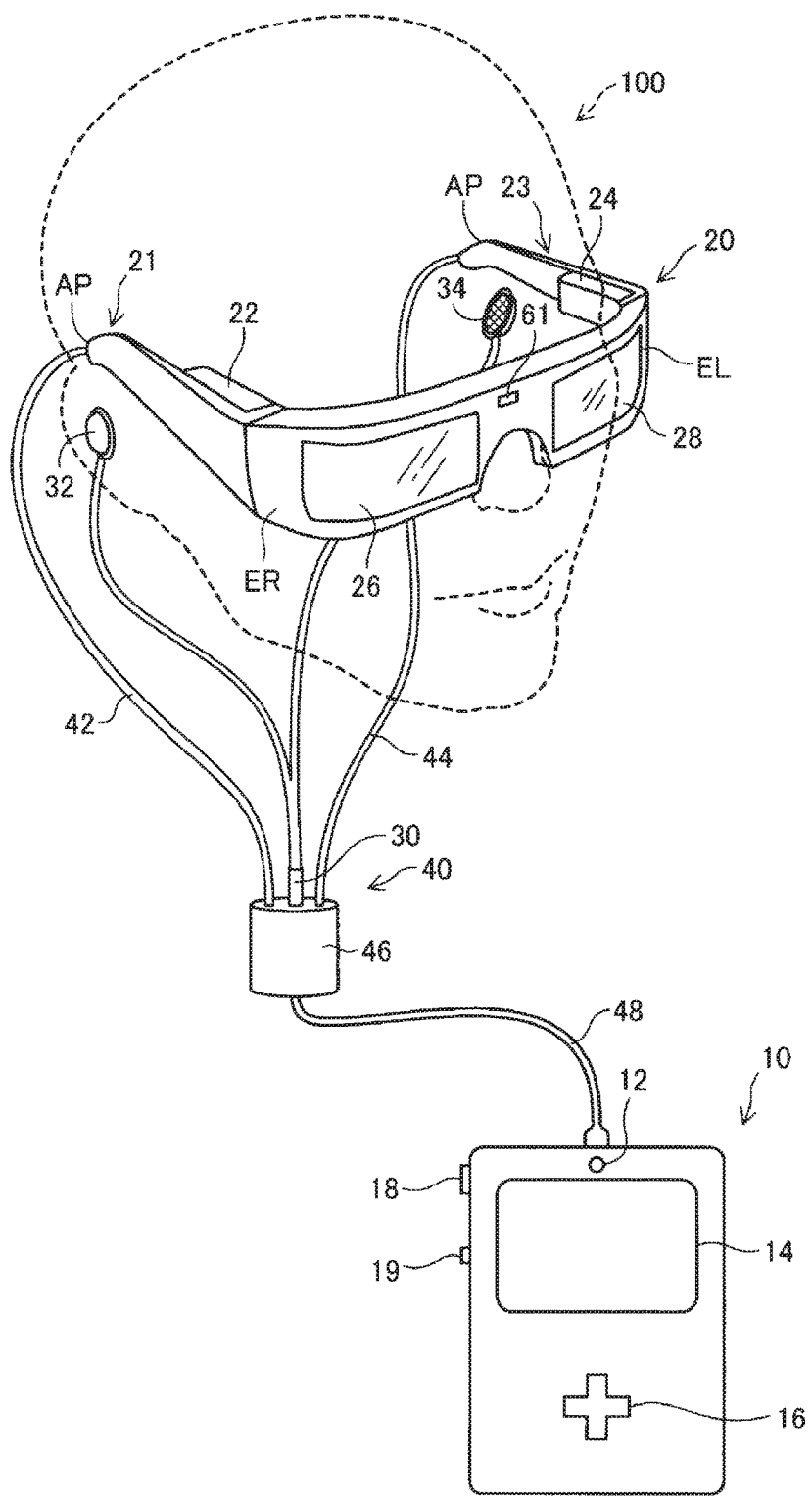
FIG. 1 is a diagram illustrating a schematic configuration of a head mounted display apparatus according to an embodiment of the invention.

FIG. 1 is a diagram illustrating a schematic configuration of a head mounted display apparatus according to an embodiment of the invention. A head mounted display apparatus 100 is worn on the head and hereinafter will also be referred to as "head mounted display 100". The head mounted display 100 according to the embodiment is an optically transmissive head mounted display apparatus with which the user can visually recognize a virtual image and can visually recognize an outside scene directly at the same time.

The head mounted display 100 includes: an image display unit 20 that allows the user to visually recognize a virtual image in a state of being worn on the head of the user; and a control unit (controller) 10 that controls the image display unit 20.

The image display unit 20 is a wearing body that is worn on the head of the user and has an eyeglass shape in this embodiment. The image display unit 20 includes a right holding unit 21, a right display driving unit 22, a left holding unit 23, a left display driving unit 24, a right optical-image display unit 26, a left optical-image display unit 28, and a camera 61. The right optical-image display unit 26 and the left optical-image display unit 28 are arranged to be positioned before the right and left eyes of the user when the user wears the image display unit 20. An end of the right optical-image display unit 26 and an end of left optical-image display unit 28 are connected to each other in a position corresponding to the middle of the forehead of the user when the user wears the image display unit 20.

The right holding unit 21 extends from an end ER, which is the other end of the right optical-image display unit 26, to a position corresponding to the temple of the user when the user wears the image display unit 20. Likewise, the left holding unit 23 extends from an end EL, which is the other end of the left optical-image display unit 28, to a position corresponding to the temple of the user when the user wears the image display unit 20. The right holding unit 21 and the left holding unit 23 hold the image display unit 20 on the head of the user as in the temples of glasses.

The right display driving unit 22 is arranged inside the right holding unit 21, that is, on a side opposite the head of the user when the user wears the image display unit 20. In addition, the left display driving unit 24 is arranged inside the left holding unit 23. Hereinafter, the right holding unit 21 and the left holding unit 23 will be collectively referred to simply as "holding unit", the right display driving unit 22 and the left display driving unit 24 will be collectively referred to simply as "display driving unit", and the right optical-image display unit 26 and the left optical-image display unit 28 will be collectively referred to as "optical-image display unit".

The display driving unit includes liquid crystal displays 241 and 242 (hereinafter, referred to as "LCD") and projection optical systems 251 and 252 (refer to FIG. 2). The details of a configuration of the display driving unit will be described below. The optical-image display unit as an optical member includes light guide plates 261 and 262 (refer to FIG. 2) and a dimming plate. The light guide plates 261 and 262 are formed of an optically transparent resin material or the like and guide image light, which is output from the display driving unit, to the eyes of the user. The dimming plate is an optical member having a thin plate shape and is arranged to cover the front side (side opposite the eyes of the user) of the image display unit 20. The dimming plate protects the light guide plates 261 and 262 and suppresses damages to the light guide plates 261 and 262, adhesion of stains, and the like. In addition, by adjusting light transmittance of the dimming plate, the intensity of external light entering the eyes of the user can be adjusted and the easiness of the visual recognition of a virtual image can be adjusted. The dimming plate is not necessarily provided.

The camera 61 is arranged in a position corresponding to the middle of the forehead of the user when the user wears the image display unit 20. The camera 61 picks up an image of an outside scene (scene on the outside) in a front side direction of the image display unit 20, that is, in a visual field direction of the user wearing the head mounted display 100. The camera 61 is a so-called visible light camera and includes an imaging device such as a charge coupled device (CCD) or a complementary metal-oxide semiconductor (CMOS). An outside scene image acquired by the camera 61 is an image indicating the shape of an object from visible light radiated from the object. In the embodiment, the camera 61 may be a monocular camera or a stereo camera. In addition, an installation position of the camera 61 is not limited to the middle of the forehead of the user and may be the end EL or the end ER of the image display unit 20.

The image display unit 20 includes a connecting unit 40 for connecting the image display unit 20 to the control unit 10. The connecting unit 40 includes a main body cord 48 that is connected to the control unit 10, a right cord 42 and left cord 44 that are branched from the main body cord 48, and a coupling member 46 that is provided in a branching point. The right cord 42 is inserted from a distal end AP of the right holding unit 21 in the extending direction thereof to the inside of a housing of the right holding unit 21 and is connected to the right display driving unit 22. Likewise, the left cord 44 is inserted from a distal end AP of the left holding unit 23 in the extending direction thereof to the inside of a housing of the left holding unit 23 and is connected to the left display driving unit 24. The coupling member 46 is provided with a jack for connecting a earphone plug 30 thereto. A right earphone 32 and a left earphone 34 extend from the earphone plug 30.

The image display unit 20 and the control unit 10 transmit various signals through the connecting unit 40. An end of the main body cord 48 opposite the coupling member 46 and the control unit 10 are provided with connectors (not illustrated) which are fitted to each other. The control unit 10 and the image display unit 20 are connected and disconnected by establishing and releasing the fitting between the connector of the main body cord 48 and the connector of the control unit 10. For the right cord 42, the left cord 44, and the main body cord 48, for example, a metal cable or an optical fiber can be adopted.

The control unit 10 controls the head mounted display 100. The control unit 10 includes a lighting unit 12, a touch pad 14, a cross key 16, and a power switch 18. The lighting unit 12 notifies the user of the operation state (for example, ON and OFF of a power supply) of the head mounted display 100 through a lighting state thereof. As the lighting unit 12, for example, a light emitting diode (LED) can be used. The touch pad 14 detects a contact manipulation on a manipulation surface of the touch pad 14 and outputs a signal according to detected content. For the touch pad 14, various types of touch pads such as capacitive, pressure-sensitive, optical touch pads can be adopted. The cross key 16 detects a manipulation of pressing keys corresponding to up, down, left, and right directions and outputs a signal according to detected content. The power switch 18 detects a manipulation of sliding the switch to switch a power status of the head mounted display 100.

Figure 2:
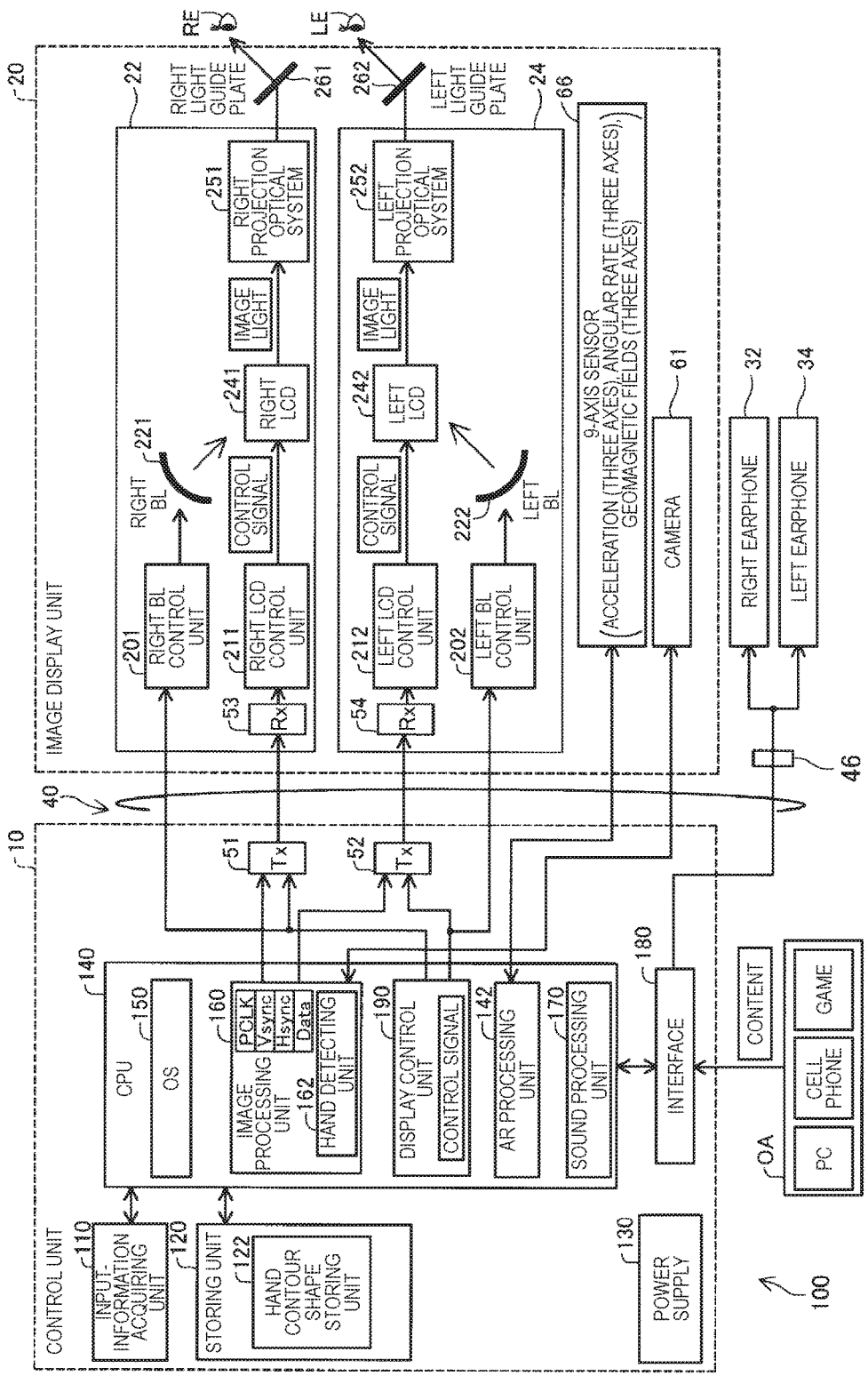
FIG. 2 is a block diagram functionally illustrating a configuration of a head mounted display.

FIG. 2 is a block diagram functionally illustrating a configuration of the head mounted display 100. The control unit 10 includes an input-information acquiring unit 110, a storing unit 120, a power supply 130, a radio communication unit 132, a GPS module 134, a CPU 140, an interface 180, and transmitting units (Tx) 51 and 52. The units are connected to one another through a bus (not illustrated).

The input-information acquiring unit 110 acquires a signal corresponding to an manipulation input to, for example, the touch pad 14, the cross key 16, and the power switch 18. The storing unit 120 is configured of a ROM, a RAM, a DRAM, a hard disk, or the like. The storing unit 120 includes a hand contour shape storing unit 122 and a frequency map 124. Stored content of the hand contour shape storing unit 122 and stored content of the frequency map 124 will be described below. The power supply 130 supplies power to the respective units of the head mounted display 100. As the power supply 130, for example, a secondary battery can be used.

The CPU 140 reads a computer program stored in the storing unit 120 and executes the computer program to function as an operating system (OS) 150, an image processing unit 160, a sound processing unit 170, a display control unit 190, and an AR processing unit 142. The AR processing unit 142 is triggered by an processing start request from the OS 150 or an specific application to execute processing for implementing augmented reality (hereinafter, also referred to as "augmented reality processing"). The details will be described below. The AR processing unit 142 corresponds to "the augmented-reality processing unit" in the appended claims.

The image processing unit 160 generates a signal based on content (image) input through the interface 180. The image processing unit 160 supplies the generated signal to the image display unit 20 through the connecting unit 40. The signal which is supplied to the image display unit 20 varies depending on whether the content is analog content or digital content. In the case of the analog content, the image processing unit 160 generates and transmits a clock signal PCLK, a vertical synchronization signal VSync, a horizontal synchronization signal HSync, and image data Data. Specifically, the image processing unit 160 acquires an image signal contained in the content. For example in the case of a moving image, the acquired image signal is generally an analog signal formed of 30 frame images per second. The image processing unit 160 separates synchronization signals such as the vertical synchronization signal VSync and the horizontal synchronization signal HSync from the acquired image signal to generate the clock signal PCLK using a PLL circuit or the like according to a period of the synchronization signals. The image processing unit 160 converts the analog signal, from which the synchronization signals are separated, into a digital image signal using an A/D conversion circuit or the like. The image processing unit 160 stores the converted digital image signal in the DRAM of the storing unit 120 frame by frame as image data Data of (RGB data). On the other hand, in the case of the digital content, the image processing unit 160 generates and transmits the clock signal PCLK and image data Data. Specifically, in the case of the digital content, since the clock signal PCLK is output in synchronization with an image signal, the generation of the vertical synchronization signal VSync and the horizontal synchronization signal HSync and the A/D conversion of the analog image signal are unnecessary. The image processing unit 160 may execute image processing including resolution conversion processing, various color tone corrections such as adjustment of brightness and saturation, and keystone correction on the image data Data stored in the storing unit 120.

The image processing unit 160 transmits the clock signal PCLK, the vertical synchronization signal VSync, the horizontal synchronization signal HSync, and the image data Data stored in the DRAM of the storing unit 120 through the transmitting units 51 and 52. The image data Data transmitted through the transmitting unit 51 will also be referred to as "image data for right eye Data1", and the image data Data transmitted through the transmitting unit 52 will also be referred to as "image data for left eye Data2". The transmitting units 51 and 52 function as a transceiver for serial transmission between the control unit 10 and the image display unit 20.

The image processing unit 160 includes a hand detecting unit 162 to participate in recognizing a hand of the user in addition to the above-described processing. Specifically, the hand detecting unit 162 of the image processing unit 160 receives an input of image pickup data obtained from each pixel of the camera 61 and executes various processes in the order of the hand recognition processing of FIG. 6 described below, the processes including: calculation of a difference between colors of adjacent pixels represented by the image pickup data; the capturing of a shape formed by sets of image pickup data in which the difference between colors of adjacent pixels is within a predetermined threshold; and determination on whether or not the captured shape is the shape of the hand of the user. Accordingly, the hand detecting unit 162 constitutes "the detecting unit" in the appended claims during the hand recognition processing of FIG. 6.

The display control unit 190 generates control signals for controlling the right display driving unit 22 and the left display driving unit 24. Specifically, the display control unit 190 individually controls, according to the control signals, ON/OFF of driving of the right LCD 241 by a right LCD control unit 211, ON/OFF of driving of a right backlight 221 by a right backlight control unit 201, ON/OFF of driving of a left LCD 242 by a left LCD control unit 212, ON/OFF of driving of a left backlight 222 by a left backlight control unit 202, and the like to thereby control generation and emission of image light by each of the right display driving unit 22 and the left display driving unit 24. For example, the display control unit 190 causes both of the right display driving unit 22 and the left display driving unit 24 to generate image light, causes only one of the display driving units to generate image light, or causes neither of the display driving units to generate image light. In addition, the display control unit 190 transmits the control signals for the right LCD control unit 211 and the left LCD control unit 212 respectively through the transmitting units 51 and 52. The display control unit 190 transmits the control signals for the right backlight control unit 201 and the left backlight control unit 202 respectively through the transmitting units 51 and 52.

The sound processing unit 170 acquires a sound signal included in the content, amplifies the acquired sound signal, and supplies the sound signal to a speaker (not illustrated) in the right earphone 32 connected to the coupling member 46 and a speaker (not illustrated) in the left earphone 34 connected to the coupling member 46. For example, when a Dolby (registered trademark) system is adopted, sound signal processing is performed and different sounds having, for example, varied frequencies or the like are output from the right earphone 32 and the left earphone 34, respectively.

The interface 180 connects various external apparatuses OA, which are supply sources of the content, to the control unit 10. Examples of the external apparatuses OA include a personal computer, a cell phone, and a game terminal. As the interface 180, for example, a USB interface, a micro USB interface, or a memory card interface can be used.

The image display unit 20 includes the right display driving unit 22, the left display driving unit 24, the right light guide plate 261 functioning as the right optical-image display unit 26, the left light guide plate 262 functioning as the left optical-image display unit 28, the camera 61, and a 9-axis sensor 66.

The 9-axis sensor 66 is a motion sensor for detecting acceleration (three axes), angular rate (three axes), and geomagnetic fields (three axes). The 9-axis sensor 66 is provided in the image display unit 20 and thus functions as a movement detecting unit for detecting movement of the head of the user when the image display unit 20 is worn on the head of the user. The movement of the head includes changes in the speed, the acceleration, the angular rate, and the direction of the head.

The right display driving unit 22 includes a receiving unit (Rx) 53, the right backlight (BL) control unit 201 and the right backlight (BL) 221 that function as a light source, the right LCD control unit 211 and the right LCD 241 that function as a display element, and a right projection optical system 251. The right backlight control unit 201, the right LCD control unit 211, the right backlight 221, and the right LCD 241 will also be collectively referred to as "image-light generating unit".

The receiving unit 53 functions as a receiver for serial transmission between the control unit 10 and the image display unit 20. The right backlight control unit 201 drives the right backlight 221 based on an input control signal. The right backlight 221 is a light-emitting body such as an LED or an electroluminescence (EL). The right LCD control unit 211 drives the right LCD 241 based on the clock signal PCLK, the vertical synchronization signal VSync, the horizontal synchronization signal HSync, and the image data for right eye Data1 which are input through the receiving unit 53. The right LCD 241 is a transmissive liquid crystal panel in which multiple pixels are arranged in a matrix shape.

Figure 3:
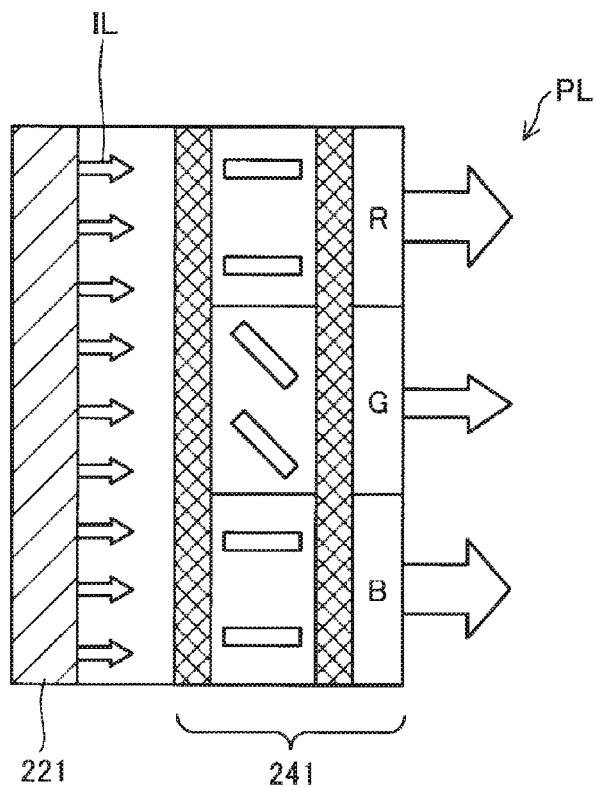
FIG. 3 is a diagram illustrating a state where image light is emitted by an image-light generating unit of a right display driving unit.

FIG. 3 is a diagram illustrating a state where image light is emitted by the image-light generating unit of the right display driving unit 22. The right LCD 241 drives liquid crystal corresponding to positions of the pixels arranged in a matrix shape to change the transmittance of light transmitting through the right LCD 241, thereby modulating illumination light irradiated from the right backlight 221 into effective image light representing an image. In the embodiment, a backlight system is adopted, but image light may be emitted using a frontlight system or a reflection system.

The right projection optical system 251 is configured of a collimate lens that changes image light emitted from the right LCD 241 into light beams in a parallel state. The right light guide plate 261 functioning as the right optical-image display unit 26 guides the image light output from the right projection optical system 251 to the right eye RE of the user while reflecting the image light along a predetermined optical path. As the optical-image display unit, an arbitrary system can be used as long as a virtual image is formed before the eyes of the user using the image light. For example, a diffraction grating may be used or a semitransparent reflection film may be used.

The left display driving unit 24 has the same configuration as the right display driving unit 22. That is, the left display driving unit 24 includes a receiving unit (Rx) 54, the left backlight (BL) control unit 202 and the left backlight (BL) 222 that function as a light source, the left LCD control unit 212 and the left LCD 242 that function as a display element, and a left projection optical system 252. The right display driving unit 22 and the left display driving unit 24 are provided as a pair. Since the units of the left display driving unit 24 have the same configurations and functions as the above-described units of the right display driving unit 22, the description thereof will not be made.

Figure 4:
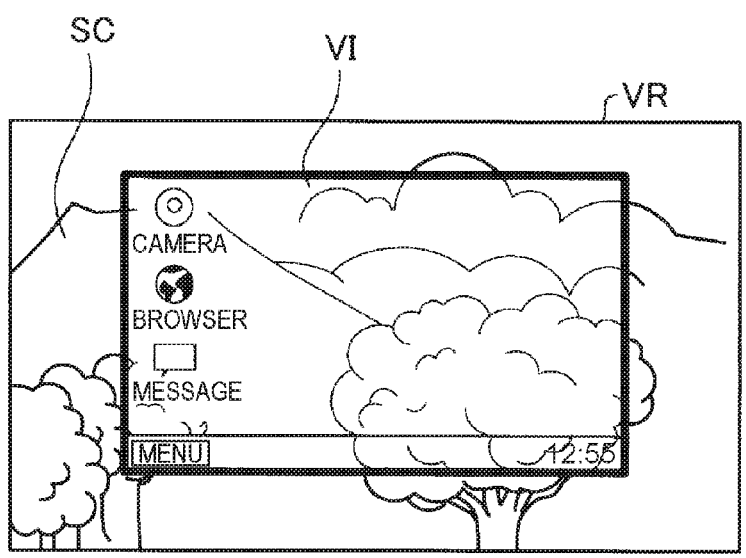
FIG. 4 is a diagram illustrating an example of a virtual image which is recognized by the user through augmented reality processing executed by an AR processing unit.

FIG. 4 is a diagram illustrating an example of a virtual image which is recognized by the user through the augmented reality processing executed by the AR processing unit 142. The image light guided to both the eyes of the user wearing the head mounted display 100 as described above forms an image on the retinas of the user. As a result, the user can visually recognize a virtual image VI. As illustrated in FIG. 4, the virtual image VI is displayed in a visual field VR of the user wearing the head mounted display 100. In a portion of the visual field VR of the user where the virtual image VI is displayed, the user can visually recognize the virtual image VI of the optical-image display unit and can visually recognize an outside scene SC, which is positioned behind the virtual image VI, through the virtual image VI. In a portion of the visual field VR of the user other than the portion where the virtual image VI is displayed, the user can directly see the outside scene SC through the optical-image display unit. Image data for displaying the virtual image VI and the outside scene SC which overlap each other as described above is generated as image data representing additional presentation information for augmenting the outside scene SC recognized by the user, through the augmented reality processing which is executed by the AR processing unit 142 of the head mounted display 100. The image data generated by the AR processing unit 142 is transmitted to the right LCD control unit 211 and the like, and the virtual image VI is displayed on a front region of the user. "Augmenting the outside scene SC" implies adding, deleting, emphasizing, and attenuating information regarding a real-world, that is, regarding the outside scene SC to augment the outside scene SC which is the real world recognized by the user. During the augmented reality processing for generating the image data, the AR processing unit 142 generates the image data for right eye Data1 and the image data for left eye Data2, which are different, to embed the outside scene SC with the additional presentation information. "Embedding the outside scene with the additional presentation information" implies displaying the virtual image VI on a position, which is distant from the user by a predetermined distance, of the outside scene SC recognized by the user, the virtual image VI making the user feel as if the additional presentation information is present. For example, if the virtual image VI visually recognized by the user in FIG. 4 is an apple, image data representing this apple image data which overlaps a real road included in the outside scene SC is generated through the augmented reality processing, and an image based on this generated image data is displayed as the virtual image VI. As a result, the user can feel as if the apple falls on the road where there is nothing, and the AR processing unit 142 generates, through the augmented-reality processing, the above-described data for right eye and data for left eye for displaying the virtual image VI illustrated in FIG. 4 or the virtual image VI representing the apple on the real outside scene SC to be distant from the user by a predetermined distance and outputs the data.

A-2. Hand Recognition Processing

Figure 5:
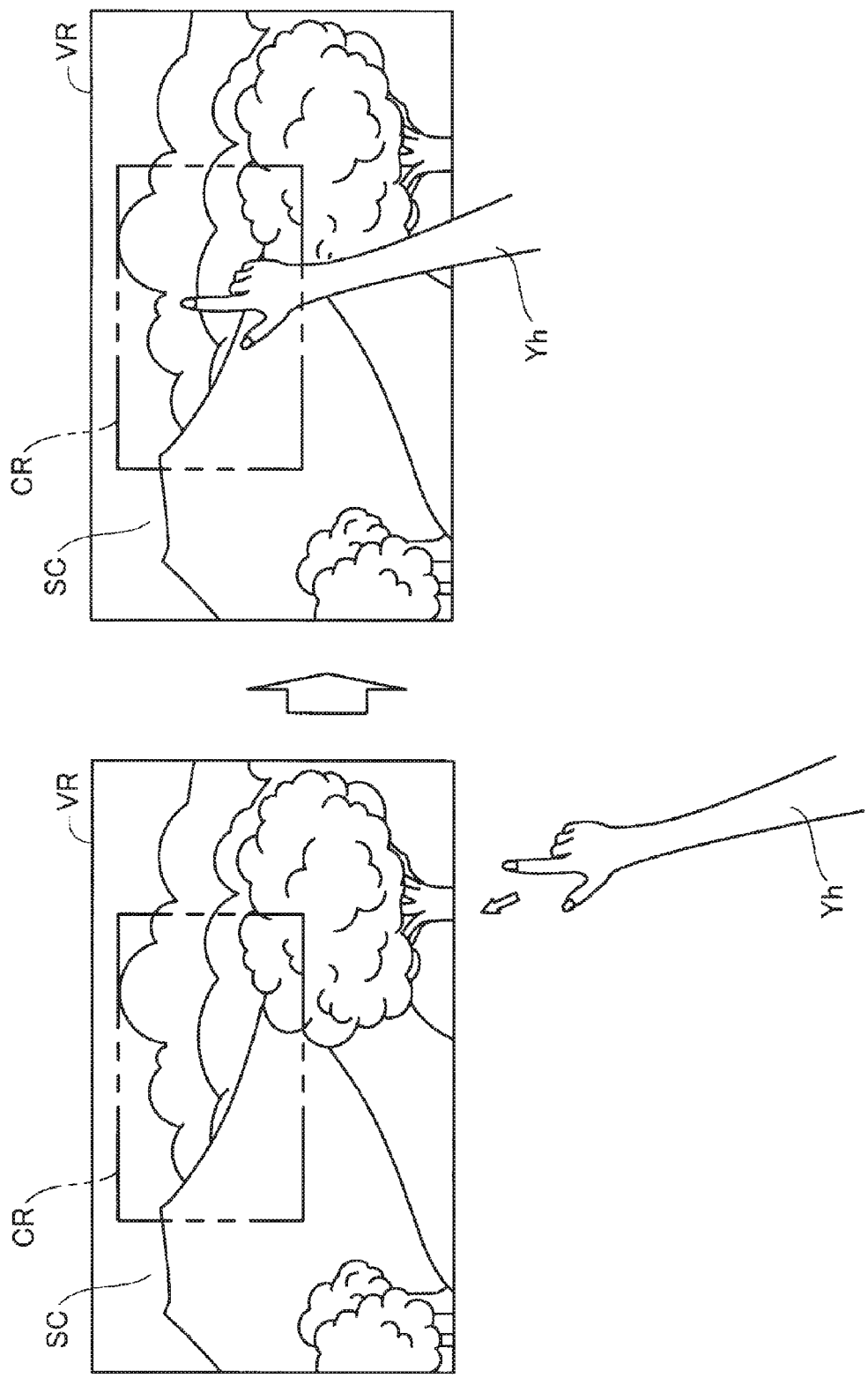
FIG. 5 is a diagram illustrating the summary of hand recognition processing which is executed by a CPU including an image processing unit and the AR processing unit.
Figure 6:
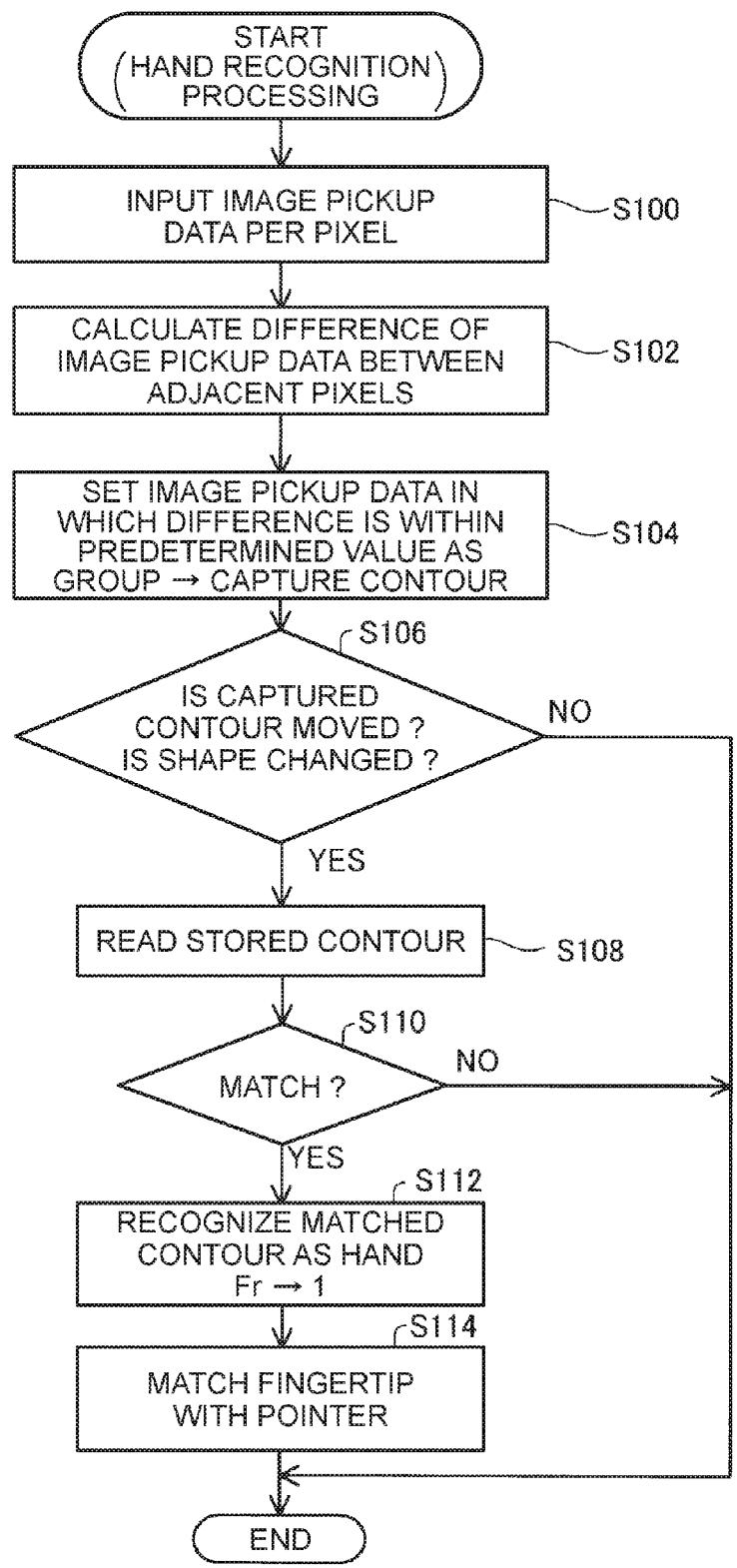
FIG. 6 is a flowchart illustrating the order of the hand recognition processing.

FIG. 5 is a diagram illustrating the summary of hand recognition processing which is executed by the CPU 140 including the image processing unit 160 and the AR processing unit 142. As illustrated in FIG. 1, the head mounted display 100 includes the camera 61 in the image display unit 20. Since the camera is positioned in the middle of the forehead, an image pickup region CR of the camera 61 occupies substantially the center of an information region of the visual field VR as illustrated in FIG. 5. The user recognizes an approximate position occupied by this image pickup region CR based on the camera position and thus can put a hand Yh thereof into the image pickup region CR by its own will. When the user puts the hand Yh into the image pickup region CR, the camera 61 picks up images of the outside scene SC including the hand Yh and outputs image pickup data corresponding to the individual pixels to the CPU 140. In the case of the outside scene SC of FIG. 5, when the user changes a point of view, a flying bird or a vehicle travelling the road may enter the image pickup region CR. In addition, for example, when the user wears the head mounted display 100 in a room, a table, a chair, a pet dog or cat, the face of a friend, and the like may enter the image pickup region CR. The camera 61 picks up images of the above-described objects and outputs image pickup data corresponding to the individual pixels to the CPU 140. The head mounted display 100 according to the embodiment determines whether or not an object entering the image pickup region CR is the hand Yh of the user as follows. FIG. 6 is a flowchart illustrating the order of the hand recognition processing.

Figure 7:
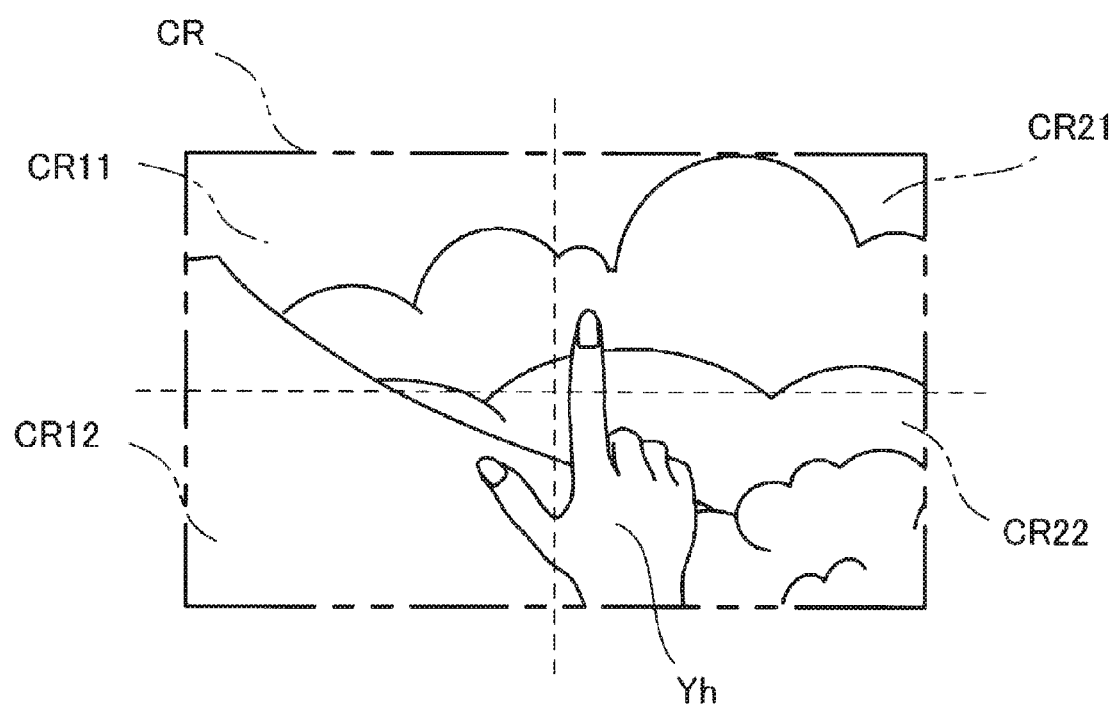
FIG. 7 is a diagram illustrating an input status of image pickup data.
Figure 8:
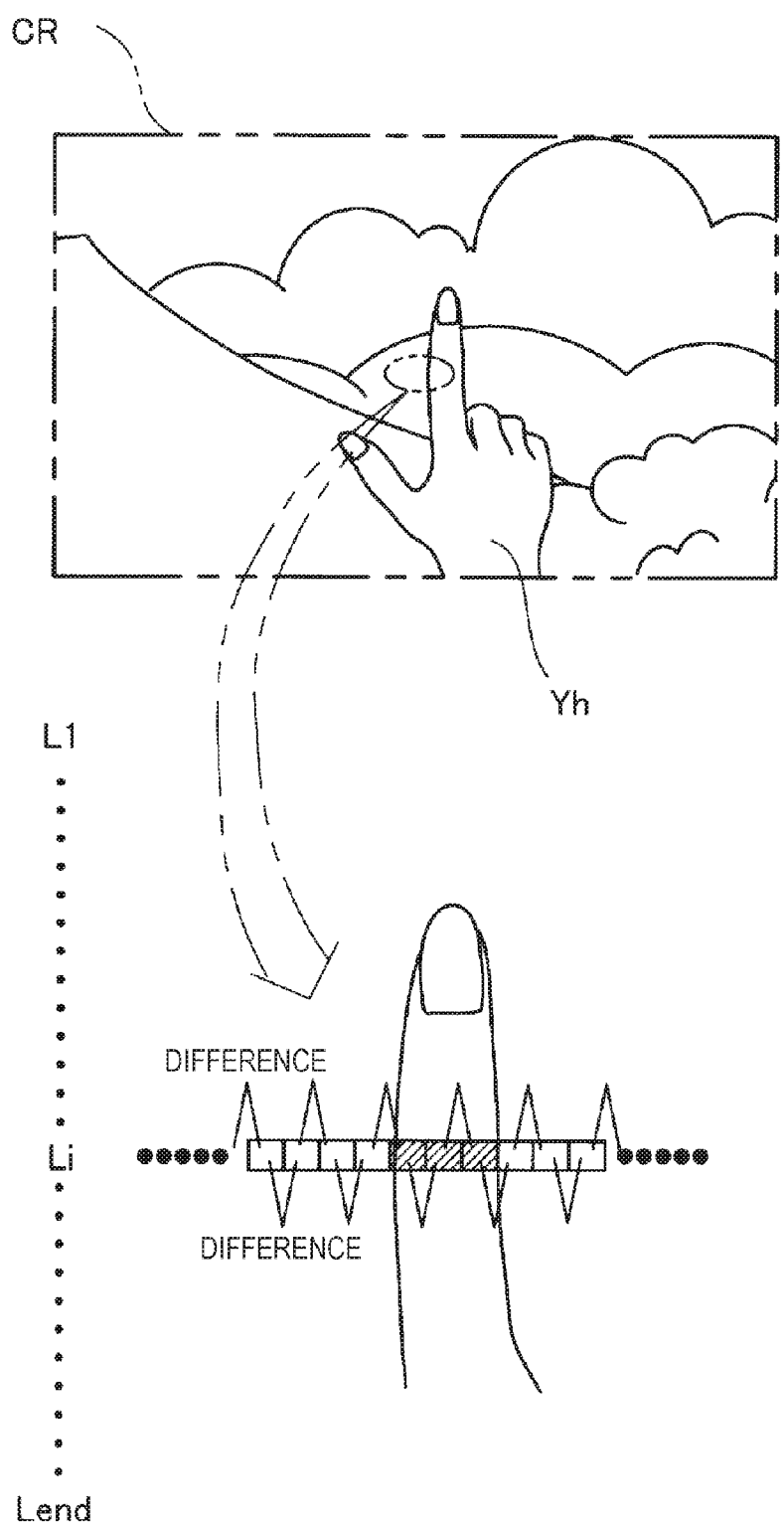
FIG. 8 is a diagram schematically illustrating a state where a difference between adjacent pixels of a part of a hand in an image pickup region is calculated.

This hand recognition processing is repeatedly executed, and the image processing unit 160 receives an input of image pickup data per pixel included in the camera 61 (Step S100). FIG. 7 is a diagram illustrating an input status of the image pickup data. As illustrated in FIG. 7, in the embodiment, the image pickup region CR is vertically and horizontally divided into four divided regions CR11 to CR22, and these divided regions CR11 to CR22 are set as the unit of data input. Moreover, data is input for each divided region while being scanned for each divided region in the horizontal direction by setting an upper left pixel of each divided region as a data input start point and setting a lower right pixel of each divided region as a data input end point. Such scanning input of data is executed in the following order: divided region CR11→CR12→CR21→CR22. When receiving a scanning input of the image pickup data, the image processing unit 160 cancels movement of the head of the user such as tilting or twisting based on sensor outputs from the 9-axis sensor 66. While receiving the scanning input of the image pickup data for each divided region along rows of pixels, the image processing unit 160 calculates a difference in pixel value between colors of adjacent pixels represented by the input image pickup data (Step S102). FIG. 8 is a diagram schematically illustrating a state where a difference in pixel value between adjacent pixels of a part of the hand in the image pickup region CR is calculated.

Figure 9:
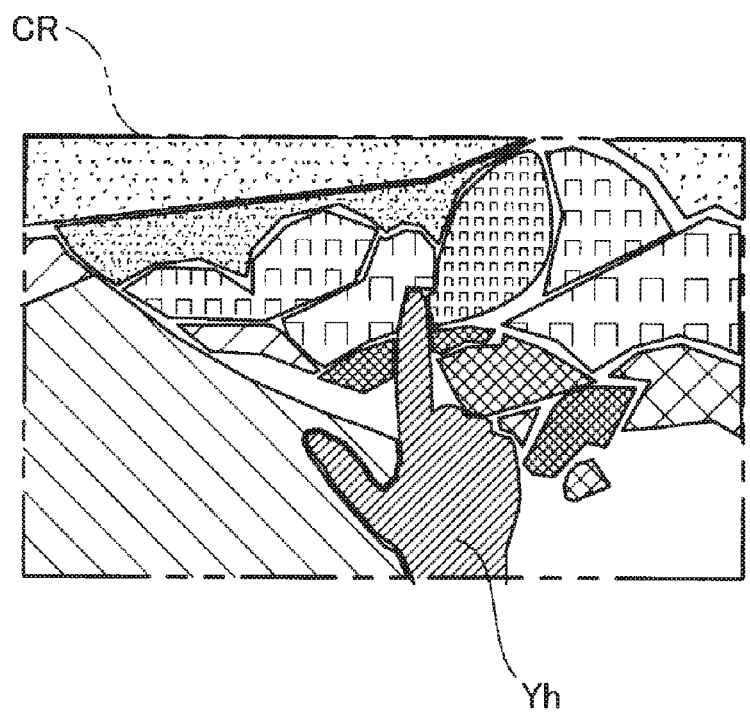
FIG. 9 is a diagram schematically illustrating the results of the difference calculation and grouping in the entire region of the image pickup region.

After the calculation of the difference in pixel value between adjacent pixels, the image processing unit 160 sets a set of image pickup data in which the calculated difference in pixel value is within a predetermined threshold as a group (Step S104). In FIG. 8, in a pixel row Li, a calculated difference in pixel value between adjacent pixels in a range occupied by a finger of the hand Yh of the user is within a predetermined threshold. Therefore, this range is set as a group. Such grouping is performed in pixel rows other than the pixel row Li. The difference between colors of adjacent pixels being within a predetermined threshold has the same meaning as the colors of the adjacent pixels being the same in the threshold range. By the grouping of Step S104, a region with the same color system is distinguished from the other regions. In FIG. 8, the region of the hand Yh of the user is distinguished from the other regions, and thus the contour shape thereof is captured. In addition, in the regions other than the hand Yh of the user in FIG. 8, a difference in pixel value between adjacent pixels is also calculated, and a set of image pickup data in which the calculated difference is in a predetermined threshold is set as a group. FIG. 9 is a diagram schematically illustrating the results of the difference calculation and grouping in the entire region of the image pickup region CR. As illustrated in FIG. 9, for example, if an image of a cloud, a mountain, or a tree having the same color is picked up in an area positioned on the left, right, or upper side of the hand Yh, a set of image pickup data of the cloud, the mountain or the tree in which a calculated difference is within a predetermined threshold is also set as a group. In the embodiment, when a contour shape captured by the above-described grouping is less than the size of the hand Yh of the user imaged by the camera 61, this shape is excluded from an object for shape comparison described below. As a result, a load of calculation required for the shape comparison can be reduced.

Next, the image processing unit 160 compares a contour captured by the grouping of Step S104 during the previous hand recognition processing to a contour captured by the grouping of Step S104 during the present hand recognition processing to determine whether the captured contour is moved or the contour shape is changed (Step S106). For example, in FIG. 8, when the user moves the hand Yh while maintaining the shape of the fingers (as illustrated in Fig.) or when the user bends the thumb, it is determined that the captured contour is moved or the contour shape is changed, and the image processing unit 160 reads a stored hand contour from the hand contour shape storing unit 122 of the storing unit 120 as a comparative shape (Step S108). On the other hand, when the captured contour is not moved or the contour shape is not changed, there is a high possibility that the captured contour is a cloud, a mountain, or a tree in FIG. 8 or an indoor table, an indoor chair, or the like during indoor use. Accordingly, it is determined that the hand recognition after Step S108 is unnecessary, and this routine is finished. In this case, the user may not move the hand Yh after putting the hand Yh into the image pickup region CR. However, since there is a movement when the user puts the hand Yh into the image pickup region CR, YES is determined in Step S106, and the process proceeds to Step S108. Moreover, the determination processing in Step S106 may not be provided, and the stored hand contour which is the comparative shape may be read in Step S108 after the contour capturing in Step S104.

Figure 10:
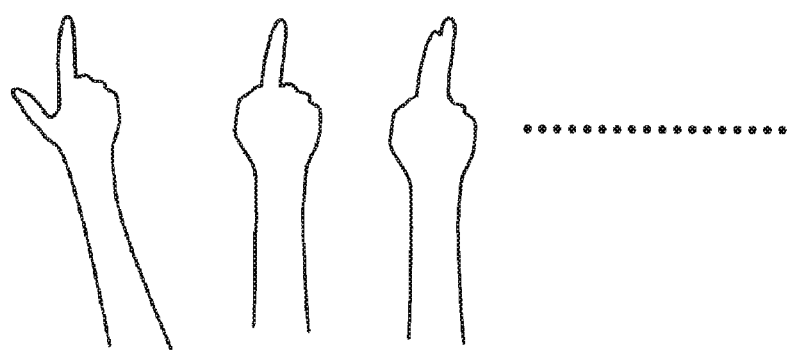
FIG. 10 is a diagram illustrating the summary of hand contours which are stored in a hand contour shape storing unit of a storing unit.

FIG. 10 is a diagram illustrating the summary of hand contours which are stored in the hand contour shape storing unit 122 of the storing unit 120 as a comparative shape. As illustrated in FIG. 10, in the hand contour shape storing unit 122, data representing a contour of the hand Yh where the thumb is open and the index finger is stretched, data representing a contour of the hand Yh where only the index finger is stretched and the other fingers are bent, data representing a contour of the hand Yh where the index finger and the middle finger are stretched, and the like are stored. These contours are defined and data regarding the contours are generated while preliminarily estimating the shapes of the hand Yh which can be formed when the user puts the hand into the image pickup region CR of the camera 61, and stored in the hand contour shape storing unit 122 in advance. In Step S108 following Step S106, the image processing unit 160 reads the contour data of the hand Yh of FIG. 10 and compares the captured contour of Step S104 to the contours corresponding to the contour data of the hand Yh of FIG. 10 to determine whether or not they match (Step S110). The image processing unit 160 performs this determination using a method such as an unevenness comparison method of comparing unevenness statuses. When it is determined that the contours match, the image processing unit 160 recognizes the determined contour as the hand Yh of the user and sets the value "1", which indicates that the hand recognition is completed, to a recognition flag Fr (Step S112). The default value of this recognition flag Fr is 0, and 0 is reloaded in the recognition flag Fr when the head mounted display 100 is turned off or while notification processing described below is executed.

Figure 11:
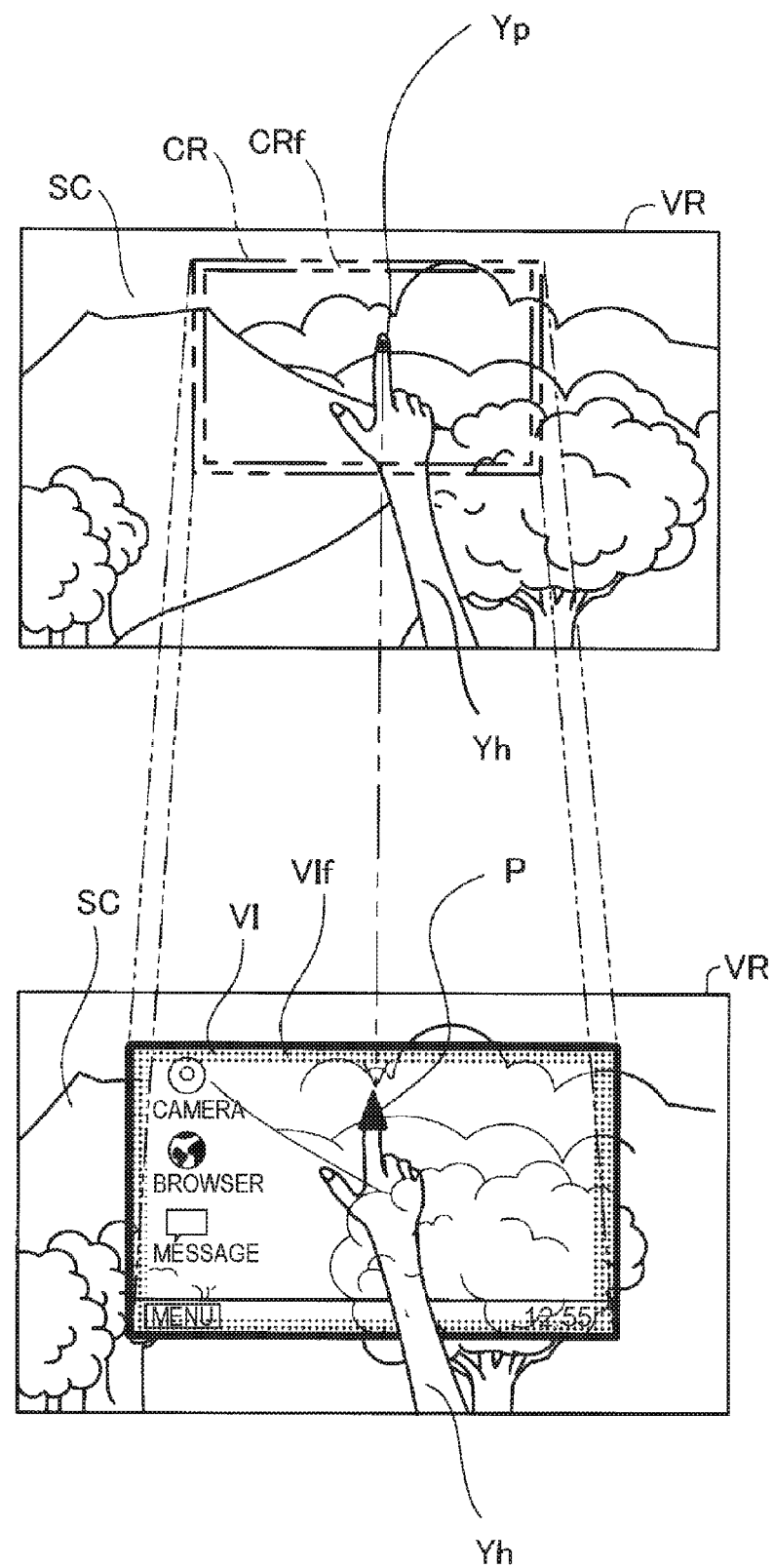
FIG. 11 is a diagram schematically illustrating a state where a virtual image is embedded with a pointer corresponding a fingertip of a recognized hand of the user.

Next, the image processing unit 160 modifies image data for forming the virtual image VI in cooperation with the AR processing unit 142 and the like such that a part of the hand Yh of the user recognized in Step S112, for example, the virtual image VI is embedded with a pointer P corresponding to a fingertip (Step S114). Due to the modified image data, the user visually recognizes the virtual image VI including the pointer P. FIG. 11 is a diagram schematically illustrating a state where the virtual image VI is embedded with the pointer P corresponding to the fingertip of the recognized hand Yh of the user. The part of the finger of the user corresponding to the pointer P in the virtual image VI is not limited to the fingertip and may be the base of a finger or the middle of a stretched finger in the hand Yh of the user recognized in Step S112.

The image processing unit 160 calculates coordinates of the fingertip of the hand Yh in the image pickup region CR from the rows of the pixels corresponding to the image pickup data output from the camera 61 and calculates fingertip coordinates, which are converted from the above coordinates when the image pickup region CR is modified according to a display rectangle of the virtual image VI, as coordinates of the pointer P. The AR processing unit 142 regenerates (modifies) the image data for forming the virtual image VI such that the pointer P is displayed at the converted coordinates of the virtual image VI. As a result, as illustrated in FIG. 11, the user visually recognizes the virtual image VI including the pointer P. Next, whenever the hand Yh of the user moves in the range of the image pickup region CR, the image processing unit 160 calculates coordinates of the fingertip of the hand Yh and calculates converted coordinates of the pointer in the virtual image VI. In response to this, the AR processing unit 142 updates image data for displaying the virtual image VI along the movement of the fingertip of the hand Yh. Therefore, the AR processing unit 142 allows the user to visually recognize the virtual image VI while moving the pointer P in the virtual image VI.

In addition, the image processing unit 160 embeds the virtual image VI with not only the pointer P but a rectangular frame VIf in an inside periphery of the display rectangle of the virtual image VI to be visually recognized by the user. This rectangular frame VIf is displayed to correspond to an outer peripheral region CRf forming an outer periphery of the image pickup region CR by the AR processing unit 142 generating image data thereof. As a result, the user recognizes a positional relationship between the outer periphery of the image pickup region CR and the hand Yh. The rectangular frame VIf may be displayed at all times or may be triggered to be displayed by a manipulation, for example, a touch operation of the touch pad 14 by the user.

A-3. Notification Processing

Figure 12:
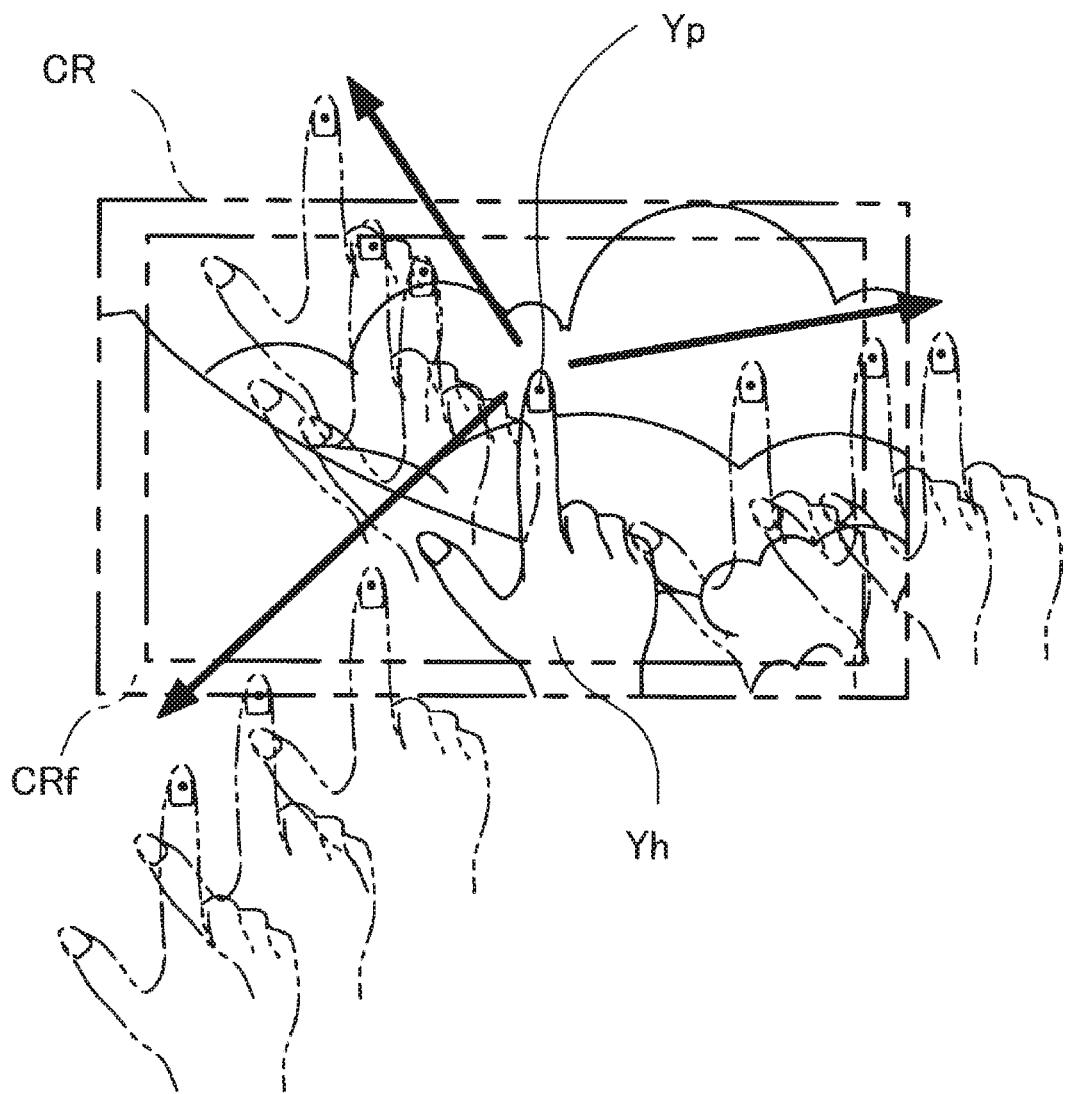
FIG. 12 is a diagram illustrating the summary of notification processing which is executed by a control unit including the image processing unit and the AR processing unit.
Figure 13:
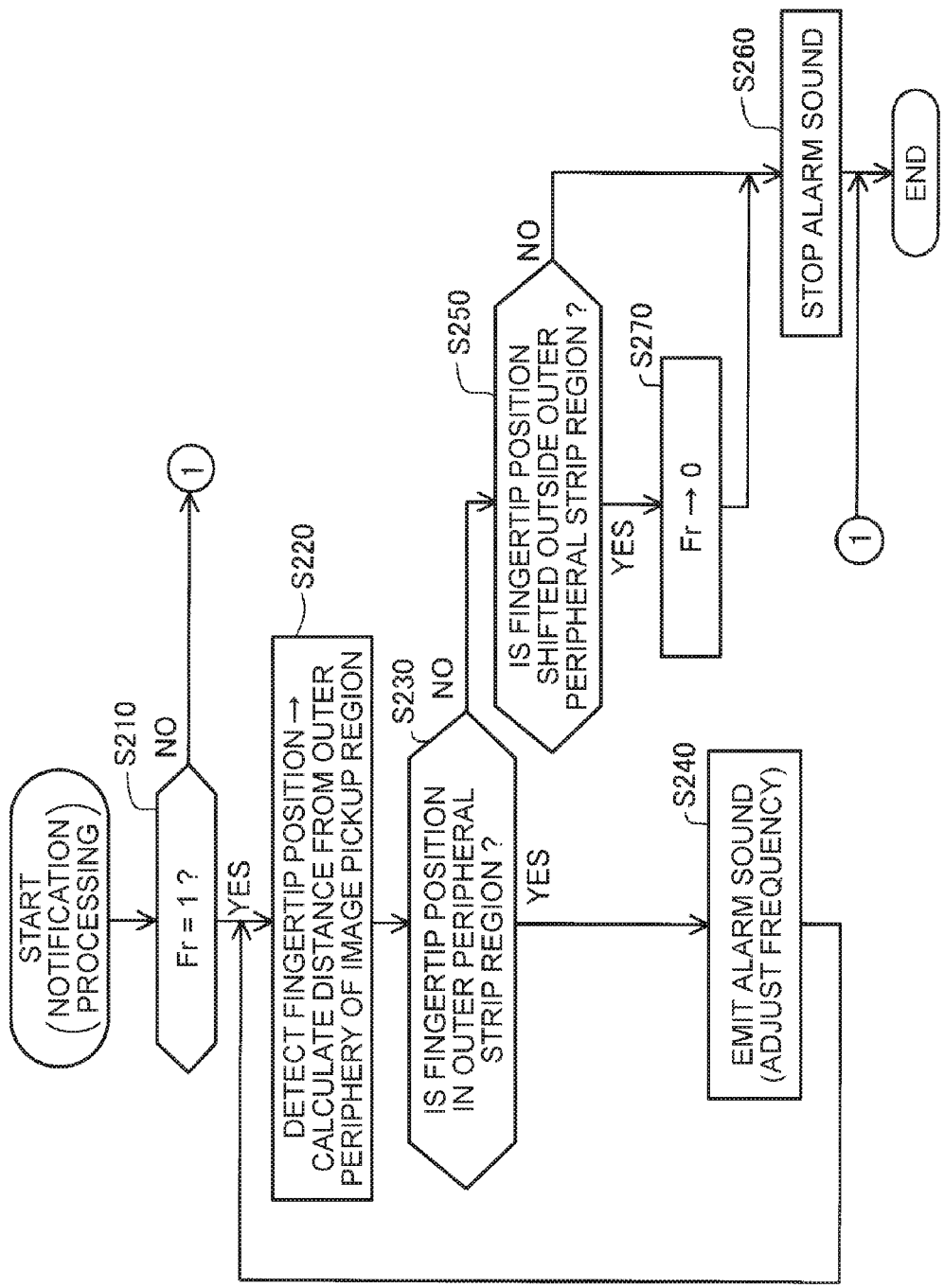
FIG. 13 is a flowchart illustrating the order of the notification processing.

FIG. 12 is a diagram illustrating the summary of notification processing which is executed by the control unit 10 including the image processing unit 160 and the AR processing unit 142. As illustrated in FIG. 12, after putting the hand Yh into the image pickup region CR, the user moves the hand Yh in the image pickup region CR or moves the hand from the inside of the image pickup region CR to the outside peripheral side thereof. Such a movement of the hand is performed by the user having an intention, but the user may not be able to visually recognize the image pickup region CR of the camera 61. Therefore, the user intends to move in the image pickup region CR; however, contrary to this intention, the fingertip of the hand Yh may pass the outer peripheral region CRf forming the outer periphery of the image pickup region CR, and the hand Yh may move to the outside of the image pickup region CR. As described above using FIG. 11, the fingertip of the hand Yh corresponds to the pointer P. Therefore, when the fingertip of the hand Yh moves up to the outside of the image pickup region CR, the user cannot recognize the pointer P corresponding to the fingertip included in the virtual image VI. The same shall be applied to a case where the pointer P corresponds to the base of a finger or the middle of a stretched finger in the hand Yh of the user. The base of a finger or the middle of a stretched finger may pass the outer peripheral region CRf forming the outer periphery of the image pickup region CR, and the hand Yh may move to the outside of the image pickup region CR. In this case, in order for the user to move the hand Yh in the image pickup region CR, the head mounted display 100 according to the embodiment executes the notification processing described below. FIG. 13 is a flowchart illustrating the order of the notification processing.

This hand recognition processing is repeatedly executed, and the control unit 10 determines whether or not the value "1" is set to the above-described recognition flag Fr (Step S210). When it is determined that the value "1" is not set to the recognition flag Fr, the hand Yh is not recognized as described above using FIG. 6, and the hand Yh is positioned outside the image pickup region CR and does not enter the image pickup region CR. In this case, there is no case where, as described above using FIG. 12, the hand Yh in the image pickup region CR moves to the outside of the image pickup region CR such that the fingertip passes the outer peripheral region CRf. Accordingly, when NO is determined in Step S210, this routine is temporarily finished.

On the other hand, when the control unit 10 determines that the value "1" is set to the recognition flag Fr in Step S210, the hand Yh is held in the image pickup region CR after entering the image pickup region CR. Accordingly, through the following processing, the control unit 10 monitors the next behavior of the hand Yh held in the image pickup region CR. That is, after YES is determined in Step S210, the control unit 10 calculates fingertip coordinates of the hand Yh in the image pickup region CR from the rows of the pixels corresponding to the image pickup data output from the camera 61, detects a fingertip position from the fingertip coordinates, and calculates a distance of the fingertip position from the outermost periphery of the image pickup region CR (Step S220).

Next, the control unit 10 determines whether or not the fingertip position is in the strip region of the outer peripheral region CRf of FIGS. 11 and 12 based on the distance of the fingertip position calculated from Step S220 (Step S230). When YES is determined in Step S230, the hand Yh held in the image pickup region CR moves to the outer peripheral region CRf. Therefore, the control unit 10 emits an alarm sound from the right earphone 32 and the left earphone 34 so as to notify the user of the fact that the hand Yh is about to move outside the image pickup region CR (Step S240).

Figure 14:
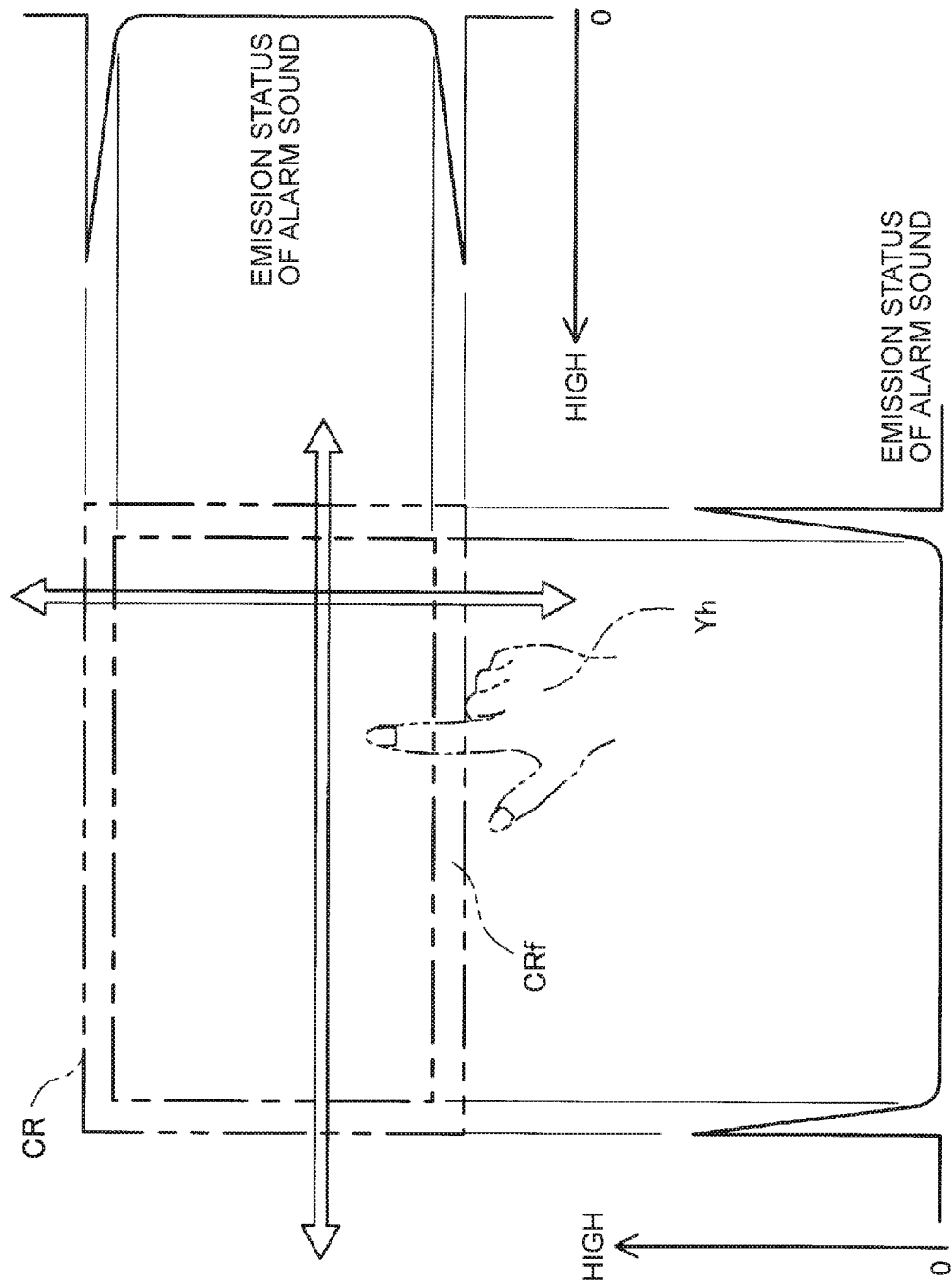
FIG. 14 is a diagram illustrating a relationship between behavior of the hand held in the image pickup region and an outer peripheral region and a relationship between the behavior of the hand held in the image pickup region and an emission status of an alarm sound.

FIG. 14 is a diagram illustrating a relationship between behavior of the hand Yh held in the image pickup region CR and the outer peripheral region CRf and a relationship between the behavior of the hand Yh held in the image pickup region CR and an emission status of the alarm sound. FIG. 14 illustrates the following. When the hand Yh is held in the image pickup region CR positioned inside the outer peripheral region CRf, an alarm sound is not emitted. As the hand Yh approaches the outermost periphery of the image pickup region CR after reaching the outer peripheral region CRf, an alarm sound in a high frequency range is emitted. When the hand Yh is out of the image pickup region CR, the emission of the alarm sound which has been emitted in a high frequency range is stopped. The relationship between the fingertip position and the outer peripheral region CRf and the relationship between the fingertip position and the frequency of the emitted alarm sound are stored in the frequency map 124 as a map of frequencies with respect to the fingertip position. Accordingly, when emitting the alarm sound in Step S240, the control unit 10 emits, with reference to the frequency map 124, an alarm sound with a frequency corresponding to the distance of the fingertip position calculated in Step S220. After such an alarm sound is emitted, the process proceeds to Step S220 described above.

In Step S220 following the emission of the alarm sound in Step S240, the distance of the fingertip position is recalculated. In the next Step S230, whether or not the fingertip position is in the outer peripheral region CRf is determined. That is, while the fingertip position is in the strip region of the outer peripheral region CRf, Steps S220 to S240 are repeated, and the alarm sound in a frequency range corresponding to the distance of the fingertip position is continuously emitted. As illustrated in FIG. 14, as the fingertip position approaches the outermost periphery of the image pickup region CR, that is, the outer periphery of the outer peripheral region CRf, the frequency of the alarm sound increases. As a result, this alarm sound notifies the user of the fact that the fingertip position is in the outer peripheral region CRf and thus the hand Yh is about to deviate from the image pickup region CR.

On the other hand, when it is determined that the fingertip position is not in the strip region of the outer peripheral region CRf in Step S230, the control unit 10 determines whether or not the fingertip position is shifted outside the outer peripheral region CRf (Step S250). The control unit 10 stores the distance of the fingertip position calculated in Step S220 in the storing unit 120 or in a specific address in a time-series manner. Therefore, the control unit 10 determines whether or not the fingertip position is shifted outside the outer peripheral region CRf based on the shift of the distance of the fingertip position. When YES is determined in Step S250, the fingertip position is shifted outside the outer peripheral region CRf, that is, the hand Yh is positioned outside the image pickup region CR. Therefore, the control unit 10 resets the recognition flag Fr (Step S270), stops the alarm sound (Step S260), and finishes this routine. When NO is determined in Step S250, the fingertip position is shifted from the outer peripheral region CRf to the inside of the image pickup region CR. Therefore, the control unit 10 allows the process to proceed to Step S280 without resetting the recognition flag Fr, stops the alarm sound, and finishes this routine.

In the head mounted display 100 according to the embodiment having the above-described configurations, when the hand Yh of the user wearing the head mounted display 100 enters the image pickup region CR of the camera 61 which picks up images of the front region of the user as illustrated in FIG. 1 (FIG. 6: Step S112), the behavior of the fingertip of the hand Yh in the image pickup region CR is monitored based on the image pickup data output from the camera 61 (FIG. 13: Steps S220 to S230). Moreover, in the head mounted display 100 according to the embodiment, when the hand Yh of the user in the image pickup region CR reaches the outer peripheral region CRf forming the outer periphery of the image pickup region CR, the alarm sound is emitted to give a notification to the user (Step S240). Accordingly, the following advantageous effects can be obtained.

It is assumed that the user moves and puts the hand Yh into the image pickup region CR of the camera 61. Next, when the user tries to move the hand Yh from the image pickup region CR to the outside thereof (refer to FIG. 12), the user which moves the hand receives, through the emission of the alarm sound, the notification that the hand Yh of the user in the image pickup region CR reaches the outer peripheral region CRf forming the outer periphery of the image pickup region CR. The user which receives this notification can recognize that, if the hand Yh is moved any further, the hand Yh would deviate from the image pickup region CR. Therefore, the user can stop the movement of the hand Yh or can return the hand Yh to the detection region such that the hand Yh is held in the image pickup region CR. As a result, according to the head mounted display 100 of the embodiment, once the hand Yh of the user is detected, this detected state can be continued, which can improve the detection accuracy of the hand Yh.

In the head mounted display 100 according to the embodiment, when the virtual image VI based on the image data generated by the AR processing unit 142 is visually recognized by the user through the image processing unit 160 and the image display unit 20, the virtual image VI is embedded with the pointer P corresponding to the fingertip of the detected hand Yh of the user based on the correspondence between the position of the fingertip position in the image pickup region CR and the position of the pointer P in the display region of the virtual image VI to be visually recognized by the user (Step S114: FIG. 11). At this time, the head mounted display 100 according to the embodiment calculates the coordinates of the fingertip of the recognized hand Yh of the user in the image pickup region CR and converts these coordinates into the coordinates of the pointer P in the virtual image VI. As a result, the pointer P is moved in the virtual image VI along the movement of the hand Yh such that the movement of the hand Yh is associated with the movement of the pointer P to be recognized by the user. Accordingly, according to the head mounted display 100 of the embodiment, the hand Yh of the user can be used for a command operation, and thus convenience can be improved. In addition, the notification that the hand Yh is detected can be given to the user in the state where the behavior of the hand Yh of the user is associated with the behavior of the pointer P of the virtual image VI.

In the head mounted display 100 according to the embodiment, when the virtual image VI based on the image data generated by the AR processing unit 142 is visually recognized by the user, the virtual image VI is embedded with the rectangular frame VIf corresponding to the outer peripheral region CRf forming the outer periphery of the image pickup region CR and is visually recognized by the user (FIG. 11). Accordingly, according to the head mounted display 100 of the embodiment, the position of the hand Yh of the user in the image pickup region CR can be reliably recognized by the user. Therefore, the detected state of the hand Yh of the user can be continued and the detection accuracy of the hand Yh can be improved with high effectiveness.

In the head mounted display 100 according to the embodiment, as the hand Yh of the user inside the image pickup region CR approaches the outer periphery of the outer peripheral region CRf forming the outer periphery of the image pickup region CR, the sound with a higher frequency is emitted. Accordingly, while the frequency of the alarm is being increased, the alarm sound notifies the user of the fact that the fingertip of the hand Yh is in the outer peripheral region CRf and thus the hand Yh is about to deviate from the image pickup region CR or the fact that the hand Yh of the user in the image pickup region CR is about to move outside the image pickup region CR. As a result, according to the head mounted display 100 of the embodiment, the user can be urged to hold the hand Yh in the image pickup region CR. Therefore, the detected state of the hand Yh of the user can be continued with higher effectiveness.

In the head mounted display 100 according to the embodiment, when the fact that hand Yh of the user is in the image pickup region CR of the camera is recognized by the user, the contour shape of the hand Yh imaged by the camera 61 is stored in the hand contour shape storing unit 122 in advance. Further, in the head mounted display 100 according to the embodiment, the image pickup data per pixel included in the camera 61 is input (Step S100), the difference between colors of adjacent pixels represented by the input image pickup data is calculated (Step S102), and a set of image pickup data having the same color system in which the calculated difference in pixel value is within a predetermined threshold is set as a group (Step S104: FIGS. 8 to 9). Furthermore, in the head mounted display 100 according to the embodiment, when the contour captured by the grouping is compared to the contour shapes of the hand Yh stored in the hand contour shape storing unit 122 (Step S110). When the contours match, the contour captured by the grouping is recognized as the hand Yh of the user in the image pickup region CR.

However, in "Handy AR: Markerless Inspection of Augmented Reality Objects Using Fingertip Tracking" and "The international Journal of Virtual Reality, 2009, 8(2): 7-12 Robust Hand Tracking Using a Simple Color Classification Technique", when a hand of the user imaged by a camera is recognized, the color of the hand is defined in advance as a model color of the skin, a region of a color which matches with the defined model color is separated from the other regions, and the shape of this separated region is recognized as the hand of the user. Accordingly, the recognition accuracy of the hand of the user can be secured to some extent by increasing the model color of the skin defined as the hand of the user or by providing a certain margin to a value of the matching determination. However, an image pickup state of the hand of the user may vary. For example, there are many cases where the illuminance around the hand of the user may be rapidly changed depending on changes in outside weather conditions at that time, changes in the irradiation state of the sunlight, the glare of reflected light or shadow, and the like. In such cases, the color of the hand does not match with the model color, which may decrease the recognition accuracy of the hand of the user. In a room, the above-described phenomenon may occur depending on illumination conditions. In addition, the color of the hand of the user varies depending on the race of a person and the individual people. Therefore, whenever the color of the hand of the user cannot be recognized, it is necessary that the model color, which is the reference for recognizing the hand of the user, be newly defined according to the color of the hand of the user. As a result, convenience deteriorates. Moreover, even when the model color is newly defined, the recognition accuracy may be decreased due to rapid changes in illuminance.

On the other hand, in the head mounted display 100 according to the embodiment, as described above, the contour is captured by the grouping based on the calculation of the color difference between adjacent pixels, and the captured contour is compared to the stored contour shapes of the hand Yh, thereby allowing the user to recognize the hand Yh. Therefore, the following advantageous effects can be obtained. That is, according to the head mounted display 100 of the embodiment, it is not necessary that the model color which is the reference for recognizing the hand of the user be defined for each color of the hand. Therefore, when the hand Yh of the user is recognized, convenience does not deteriorate. In addition, even when the illuminance around the hand of the user is rapidly changed, the respectively pixels are substantially equally affected by the rapid change during the calculation of the color difference between adjacent pixels. Therefore, the color difference between adjacent pixels is not affected that much by the rapid change in the illuminance around the hand Yh of the user. Accordingly, according to the head mounted display 100 of the embodiment, a decrease in the recognition accuracy of the hand by the rapid change in the illuminance is suppressed, and the recognition accuracy can be improved. In addition, the contour shapes of the hand stored in the hand contour shape storing unit 122 are not particularly limited as long as they are expected to be used in the image pickup region CR by the user for a purpose. It is not necessary that the stored contour shapes of the hand be limited to some extent and be newly set depending on the race of a person and the individual users. From this point of view, according to the head mounted display 100 of the embodiment, when the hand Yh of the user is recognized, convenience does not deteriorate, and the versatility of the technique for detecting a hand Yh of the user is improved, and the cost thereof can be reduced.

In the head mounted display 100 according to the embodiment, in a case where the contour captured by the grouping is compared to the contour shapes of the hand Yh stored in the hand contour shape storing unit 122, when the captured contour moves in a predetermined shape change range or when the shape of the captured contour is changed (YES in Step S106), the captured contour is compared to the stored contour shapes of the hand. As a result, the following advantageous effects can be obtained. When the camera picks up images of the front region of the user, the camera may pick up images of other objects in addition to the hand of the user. For example, when the camera confronting the user picks up images of the front region of the user, so-called still images of not only the hand Yh of the user but the face and the upper body of the user, an indoor table and an indoor chair positioned behind the user, or the like is picked up. In addition, the camera 61 equipped in the image display unit 20 picks up still images of a cloud, a mountain, or a tree in FIG. 8 or an indoor table, an indoor chair, or the like during indoor use. In the case of these still images, contours thereof are not moved and contour shapes are not changed. On the other hand, typically, the user puts the hand Yh into the image pickup region CR for some purposes. Therefore, the hand Yh may be moved in the image pickup region or the shape thereof may be changed without a significant change in position. Accordingly, even when still images of a cloud, a mountain, or a tree in FIG. 8 or an indoor table, an indoor chair, or the like during indoor use are picked up, contours are not moved and contour shapes are not changed. Therefore, the captured contours of the still images can be excluded from the comparison with the stored contour shapes of the hand. Accordingly, according to the head mounted display 100 of the embodiment, a load of calculation required for the shape comparison can be reduced.

In the head mounted display 100 according to the embodiment, in a portion where the virtual image VI including the pointer P is displayed, the user visually recognizes the outside scene SC, which is positioned behind the virtual image VI, through the virtual image VI. Accordingly, the virtual image VI is visually recognized by the user so as to be displayed on the image pickup region CR of the camera 61 through the hand Yh of the user. As a result, according to the head mounted display 100 of the embodiment, the hand Yh of the user and the virtual image VI which overlap each other are recognized by the user. Therefore, the recognition of the pointer P with respect to the operation of the hand Yh of the user can be improved.

In the head mounted display 100 according to the embodiment, when the scanning input of the image pickup data is received, the movement of the head of the user is cancelled based on sensor outputs from the 9-axis sensor 66. Accordingly, according to the head mounted display 100 of the embodiment, the contour having the same color system obtained by the grouping can be accurately captured without depending on the movement of the head of the user. Therefore, the recognition accuracy of the hand of the user can be increased.

A-4. Other Embodiment-1

Figure 15:
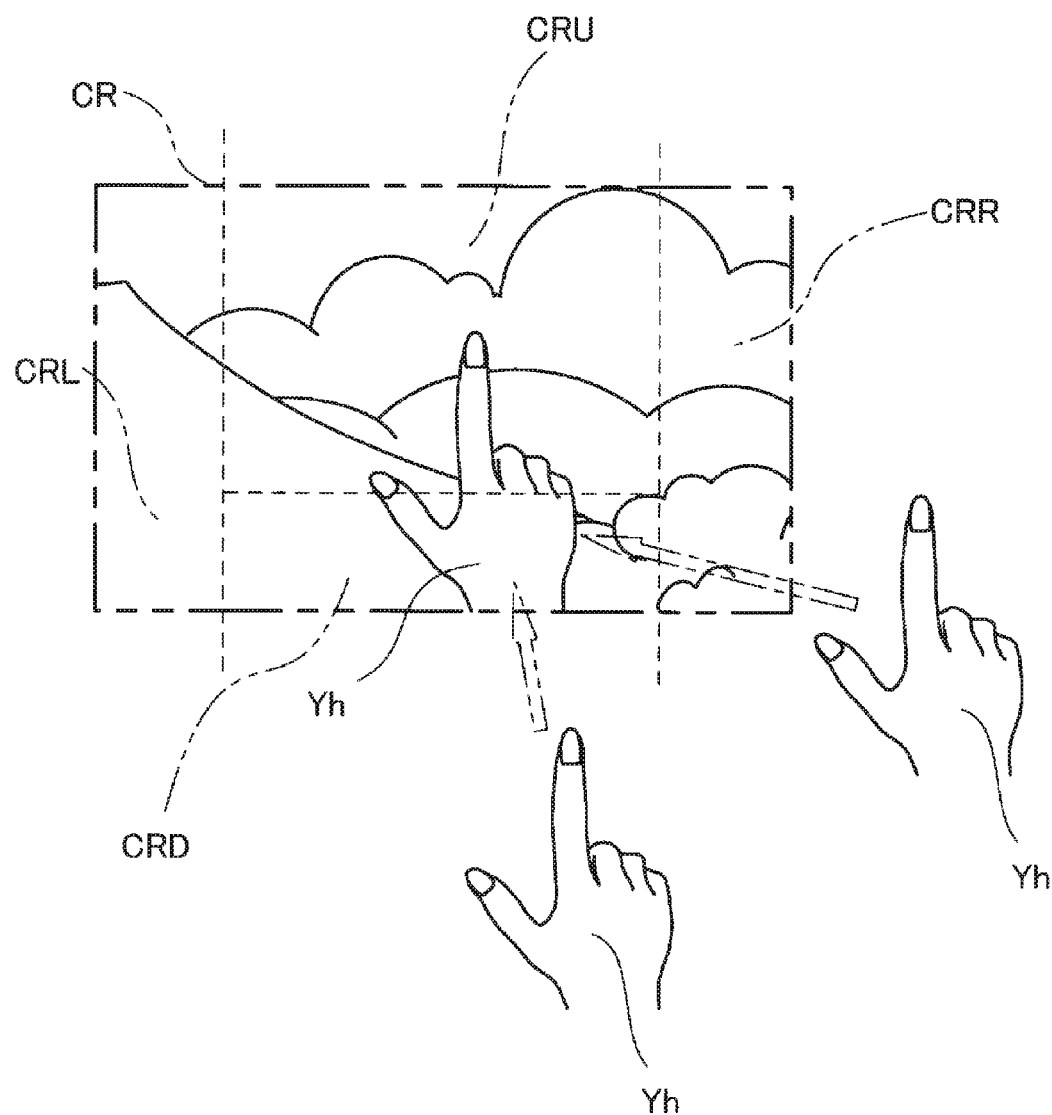
FIG. 15 is a diagram schematically illustrating hand recognition processing which is executed by a head mounted display according to another embodiment of the invention.

The head mounted display 100 can be embodied as follows. FIG. 15 is a diagram schematically illustrating hand recognition processing which is executed by a head mounted display 100 according to another embodiment of the invention. In this embodiment, the scanning input of the image pickup data in Step S100 and the difference calculation in Step S102 subsequent thereto are executed in the execution order determined for each divided region into which the image pickup region CR is divided in advance. That is, as illustrated in FIG. 15, the image pickup region CR is divided into a left end region CRL, a right end region CRR, a lower end region CRD, and a residual region CRU in advance, and the scanning input of data in the horizontal direction for each divided region is executed in the following order: the right end region CRR→the lower end region CRD→the left end region CRL. Typically, the user puts the dominant hand Yh into the image pickup region CR of the camera on the side seen from the user. Therefore, when the dominant hand Yh is the right hand, the user puts the hand Yh from the right end region CRR or from the lower end region CRD to the image pickup region CR. In the above-described embodiment, since the fingertip matches with the pointer P, even the user with the left dominant hand is expected to perform the same operation as the user with the right dominant hand. Accordingly, according to the head mounted display 100 having the configuration, the image pickup region CR is divided into the left end region CRL, the right end region CRR, the lower end region CRD, and the residual region CRU in advance, and the scanning input of data is executed in the above-described order. As a result, by associating the execution order determined for each divided region with the operation of putting the hand Yh into the image pickup region CR, the hand Yh can be rapidly recognized when the hand Yh of the user enters the right end region CRR. Then, the behavior of the hand Yh can be associated with the behavior of the pointer P by the data input in the entire region of the image pickup region CR. In the embodiment, the scanning input of data may be executed in the following order: the lower end region CRD→the right end region CRR→the left end region CRL. Alternatively, the scanning input of data may be executed in the following order: the left end region CRL→the lower end region CRD→the right end region CRR, and the difference calculation may be executed first in any region of the left end region CRL, the lower end region CRD, and the right end region CRR.

A-5. Other Embodiment-2

In a head mounted display 100 according to another embodiment of the invention, RGB-based image pickup data to be input in Step S100 is color-converted into HSV color-based data in which the color is represented by hue, saturation, and value. The color difference calculation between adjacent pixels in the next step S102 is replaced with calculation of a difference between values of adjacent pixels obtained by the color conversion. The value obtained by the color conversion of the image pickup data is separated from the brightness affected by the illuminance around the imaged hand Yh of the user during the color conversion into the HSV color system. Therefore, according to the head mounted display 100 of the embodiment using the value obtained by the color conversion into the HSV color system, a decrease in the recognition accuracy by the rapid change in illuminance can be suppressed with higher effectiveness, and the recognition accuracy of the hand Yh can be further increased.

A-6. Other Embodiment-3

Figure 16:
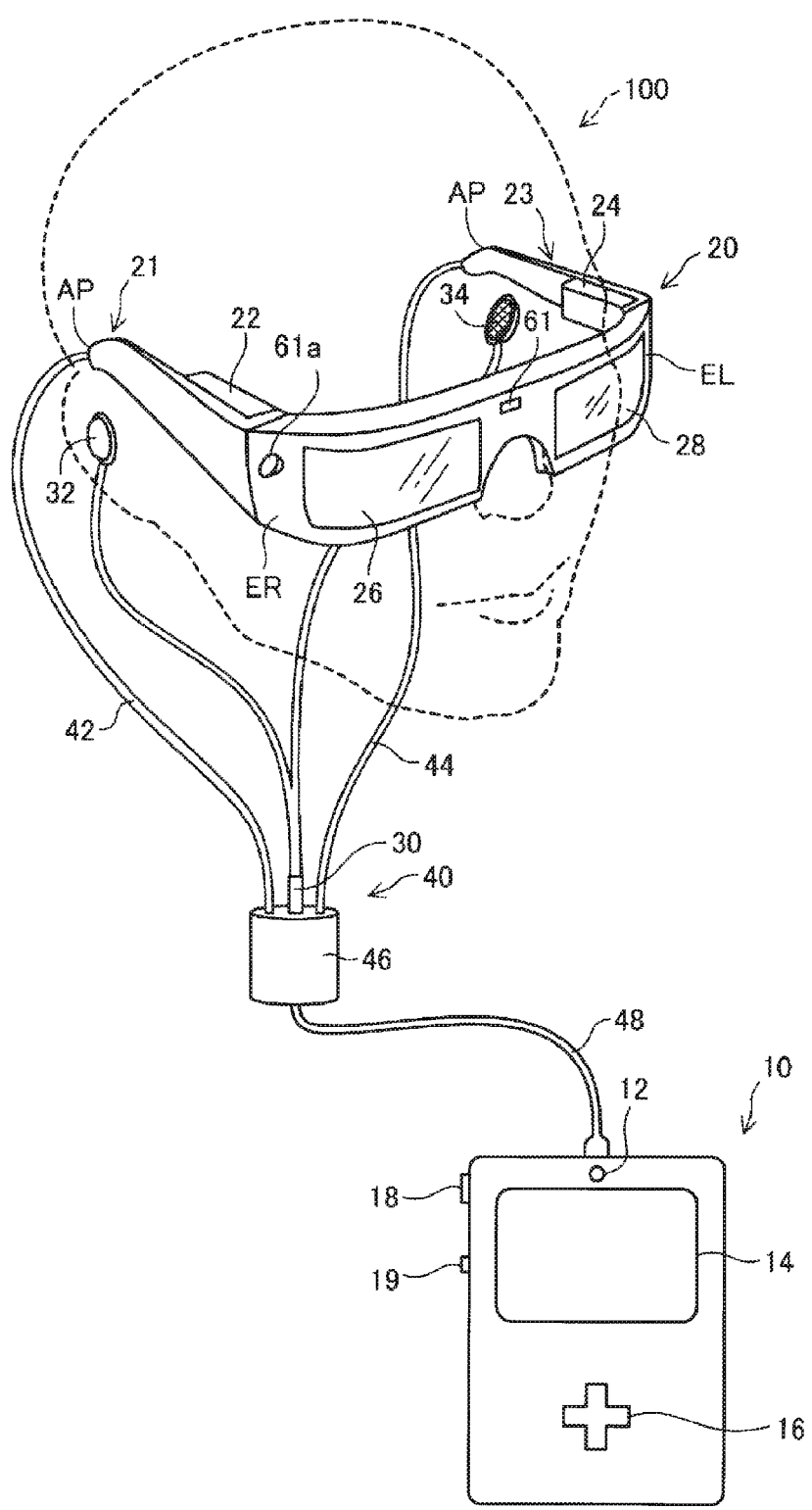
FIG. 16 is a diagram illustrating a schematic configuration of a head mounted display according to another embodiment of the invention.
Figure 17:
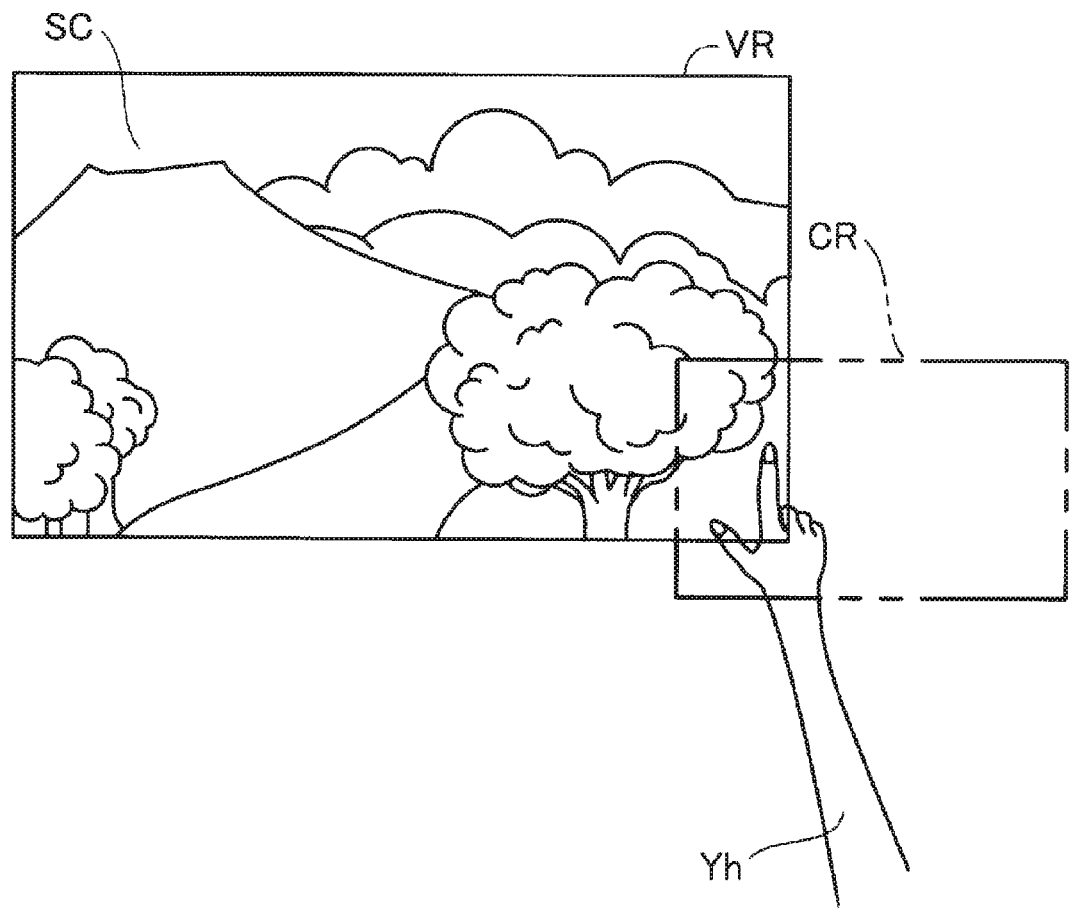
FIG. 17 is a diagram schematically illustrating a relationship between an image pickup region of a camera, which is positioned at an end of an image display unit, and a visual field of the user.
Figure 18:
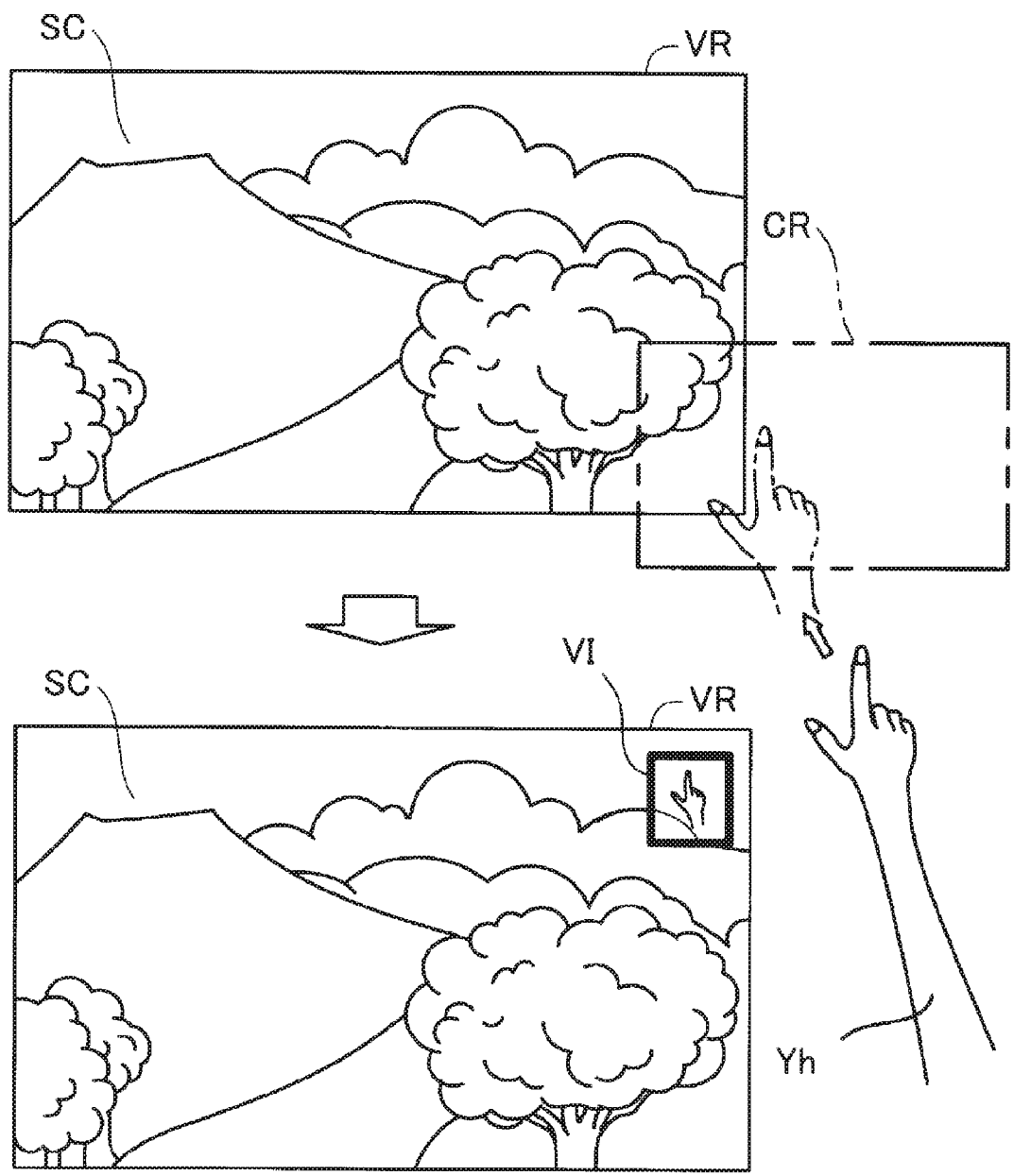
FIG. 18 is a diagram illustrating the summary of a method of detecting a hand when the image pickup region of the camera deviates from the visual field of the user.

FIG. 16 is a diagram illustrating a schematic configuration of a head mounted display 100 according to another embodiment of the invention. In this embodiment, the above-described camera 61 is used only for picking up images of the outside scene SC, and a camera 61a used only for recognizing the hand Yh of the user is further provided at the end ER of the image display unit 20. FIG. 17 is a diagram schematically illustrating a relationship between an image pickup region CR of the camera 61a, which is positioned at the end ER of the image display unit 20, and a visual field VR of the user. As illustrated in FIG. 17, the image pickup region CR of the camera 61a deviates from a region on the right end side of the visual field VR of the user or from the visual field VR due to the camera installation position. Therefore, when the hand Yh in the image pickup region CR does not substantially enter the outside scene SC in the visual field VR, and the outside scene SC does not substantially block the hand Yh. Therefore, the user can view and enjoy the outside scene SC without being disturbed by the hand Yh. The camera 61a may be provided at the end EL or may face downward such that the image pickup region CR is positioned below the visual field VR of the user. The head mounted display 100 according to the embodiment notifies the user as follows of the fact that the hand Yh of the user enters the image pickup region CR of the camera 61a. FIG. 18 is a diagram illustrating the summary of a method of detecting the hand when the image pickup region CR of the camera 61a deviates from the visual field VR of the user.

As illustrated in FIGS. 18A and 18B, in the embodiment, when the hand Yh which has been positioned outside the image pickup region CR of the camera 61a enters the image pickup region CR, the hand Yh of the user is recognized thorough the hand recognition described using FIG. 6 (Step S112). As a result, the AR processing unit 142 generates image data for displaying the virtual image VI, which indicates that the hand Yh enters the image pickup region CR and is recognized, as illustrated in the lower section of FIG. 18 and displays the virtual image VI on an upper right region of the visual field VR based on the image data. As a result, the user can recognize that the hand Yh which has been positioned outside the image pickup region CR of the camera 61a enters the image pickup region CR. Therefore, the behavior of the hand can be considered a command operation. For example, when the user moves the hand Yh after the virtual image VI is displayed as described in the lower section of FIG. 18, the control unit 10 detects this movement. As a result, the virtual image VI illustrated in FIG. 11 and including the pointer P and the rectangular frame Vif can be displayed, and a command can be executed using the pointer P. The virtual image VI illustrated in FIG. 18 may be displayed together with the rectangular virtual image VI illustrated in FIG. 11, or may be displayed to include the rectangular virtual image VI.

B. Modification Example

In the above-described embodiments, a part of configurations which are implemented by hardware may be implemented by software. Conversely, a part of configurations which are implemented by software may be implemented by hardware. In addition, the following modifications can be made.

Modification Example 1

In the above-described embodiments, the configurations of the head mounted display have been described as an example. However, the configurations of the head mounted display can be arbitrarily made within a range not departing from the scope of the invention. For example, addition, deletion, conversion, and the like can be made for each component.

In the above-described embodiments, the assignment of the components to the control unit and the image display unit is merely exemplary, and various forms can be adopted for the assignment. For example, the following forms can be adopted: (i) a form in which the control unit has processing functions of the CPU, the memory, and the like and the image display unit has only the display function; (ii) a form in which both the control unit and the image display unit have processing functions of the CPU, the memory, and the like; (iii) a form in which the control unit and the image display unit are integrated (for example, a form in which the image display unit includes the control unit and functions as a wearable computer); (iv) a form in which a smartphone or a portable game machine is used instead of the control unit; and (v) a form in which the connecting unit (cord) is not provided by configuring the control unit and the image display unit to be capable of radio communication and wireless power supply.

In the above-described embodiments, for convenience of explanation, the control unit includes the transmitting units, and the image display unit includes the receiving units. However, both of the transmitting units and the receiving units in the above-described embodiments have a function for enabling bidirectional communication and can function as transmitting and receiving units. In addition, for example, the control unit illustrated in FIG. 2 is connected to the image display unit through a wired signal transmission line. However, the control unit and the image display unit may be connected through a wireless signal transmission line such as a wireless LAN, infrared communication, or Bluetooth (registered trademark).

For example, the configurations of the control unit and the image display unit illustrated in FIG. 2 can be arbitrarily changed. Specifically, for example, the touch pad may be removed from the control unit and the control unit may be configured to be operated by only the cross key. In addition, the control unit may include another manipulation interface such as a manipulation stick. The control unit may be configured to be connected with devices such as a keyboard or a mouse. The control unit may receive an input from the keyboard and the mouse. In addition, for example, a manipulation input may be acquired not only from the touch pad and the cross key but from a foot switch (manipulation switch using a foot of the user). In addition, if a manipulation input can be acquired from the foot switch or from the visual line of the user, the input-information acquiring unit can acquire the manipulation input from the user during an operation in which it is difficult for the user to use the hands.

For example, the head mounted display is the transmissive head mounted display of the binocular type. However, the head mounted display may be a head mounted display of a monocular type. The head mounted display may be configured as a non-transmissive head mounted display in which transmission of an outside scene is blocked in a state in which the user wears the head mounted display.

Figure 19A:
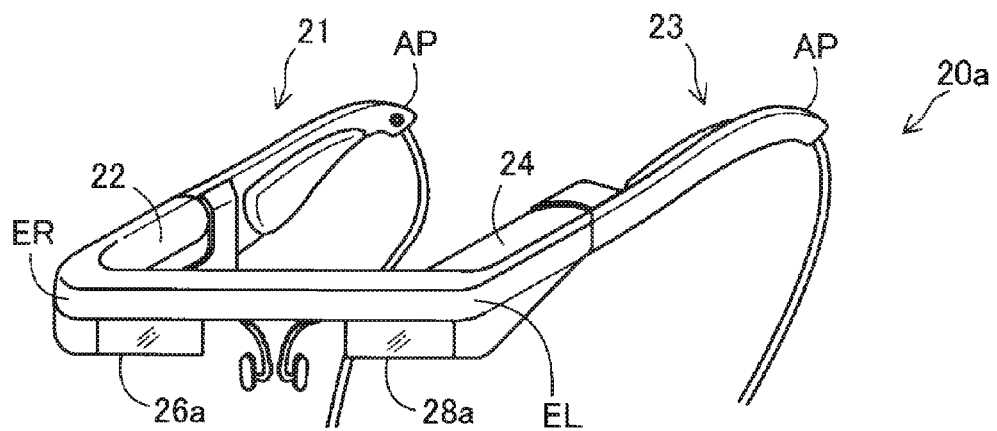
FIGS. 19A and 19B are diagrams illustrating a configuration of an external appearance of a head mounted display according to a modification example of the invention.
Figure 19B:
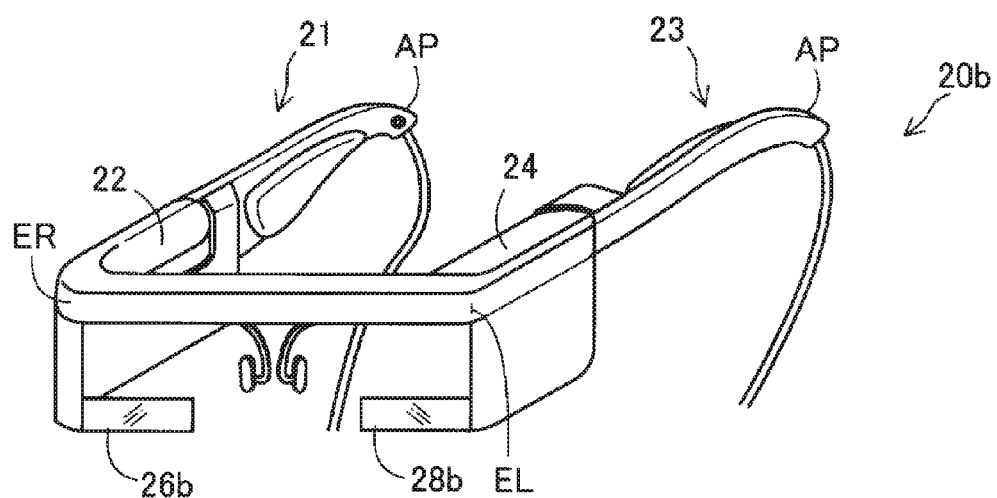

FIGS. 19A and 19B are diagrams illustrating a configuration of an external appearance of a head mounted display according to a modification example of the invention. An example of FIG. 19A is different from the head mounted display 100 illustrated in FIG. 1, in that an image display unit 20a includes a right optical-image display unit 26a instead of the right optical-image display unit 26 and includes a left optical-image display unit 28a instead of the left optical-image display unit 28. The right optical-image display unit 26a is formed to be smaller than the optical members illustrated in FIG. 1 and is arranged obliquely above the right eye when the user wears the head mounted display. Likewise, the left optical-image display unit 28a is formed to be smaller than the optical members illustrated in FIG. 1 and is arranged obliquely above the left eye when the user wears the head mounted display. An example of FIG. 19B is different from the head mounted display 100 illustrated in FIG. 1, in that an image display unit 20b includes a right optical-image display unit 26b instead of the right optical-image display unit 26 and includes a left optical-image display unit 28b instead of the left optical-image display unit 28. The right optical-image display unit 26b is formed to be smaller than the optical members illustrated in FIG. 1 and is arranged obliquely below the right eye when the user wears the head mounted display. Likewise, the left optical-image display unit 28b is formed to be smaller than the optical members illustrated in FIG. 1 and is arranged obliquely below the left eye when the user wears the head mounted display. In this way, the optical-image display units only need to be arranged near the eyes of the user. In addition, the size of the optical members which form the optical-image display units is arbitrary. A head mounted display having a configuration in which the optical-image display units cover only a part of the eyes of the user, that is, a configuration in which the optical-image display units do not completely cover the eyes of the user may also be implemented.

For example, the functional units such as the image processing unit, the display control unit, the AR processing unit, and the sound processing unit have been described as being implemented by the CPU loading the computer program, which is stored in the ROM or the hard disk, on the RAM and executing the computer program. However, the functional units may be configured using an Application Specific Integrated Circuit (ASIC) designed to implement the functions of the functional units.

For example, in the above-described embodiments, the image display unit of the head mounted display is worn like eyeglasses. However, the image display unit may be a normal flat display apparatus (for example, a liquid crystal display apparatus, a plasma display apparatus, or an organic EL display apparatus). In this case, the control unit and the image display unit may be connected through a wired signal transmission line or may be connected through a wireless signal transmission line. With such a configuration, the control unit can be used as a remote controller for the normal flat display apparatus.

Instead of the image display unit worn like eyeglasses, an image display unit having another shape such as an image display unit worn like a cap may be adopted as the image display unit. Further, an ear-hang type or a headband type may be adopted as the earphones, or the earphones may not be provided. In addition, for example, the head mounted display may be configured as a head-up display (HUD) which is mounted to vehicles such as automobiles or airplanes. In addition, for example, a head mounted display equipped with a body protector such as a helmet may also be adopted.

For example, in the above-described embodiments, the secondary battery is used as the power supply. However, the power supply is not limited to the secondary battery, and various batteries can be used. For example, a primary battery, a fuel battery, a solar battery, a thermal battery, and the like may be used.

In the above-described embodiments, for example, the image-light generating unit is configured using the backlights, the backlight control units, the LCDs, and the LCD control units. However, the above-described configuration is merely exemplary. The image-light generating unit may include components for implementing another system together with these components or instead of these components. For example, the image-light generating unit may include an organic Electro-Luminescence (EL) display and an organic-EL control unit. In addition, for example, the image-light generating unit may use a digital micromirror device instead of LCD. In addition, for example, the invention can also be applied to a head mounted display apparatus of a laser retinal projection type.

Other Modification Examples

In the above-described embodiments, as illustrated in FIG. 14, as the hand Yh in the image pickup region CR approaches the outermost periphery of the image pickup region CR after reaching the outer peripheral region CRf, the alarm sound in a higher frequency range is emitted. However, the invention is not limited to this configuration. For example, as the hand Yh approaches the outermost periphery of the image pickup region CR after reaching the outer peripheral region CRf, an alarm sound with a higher volume is emitted. In addition, a pulse-like alarm sound may be emitted, and as the hand Yh approaches the outermost periphery of the image pickup region CR after reaching the outer peripheral region CRf, the pulse-like alarm sound with a shorter period may be emitted. A voice guide such as "the hand is about to deviate from the recognition range" may be announced. In addition, the notification may be given using, instead of sound, light emission or osseous conduction in which a sound is recognized by conducting vibration to the middle ear. In the case of the notification using the light emission, as the hand Yh approaches the outermost periphery of the image pickup region CR, light rays having different colors may be emitted. Alternatively, as the hand Yh approaches the outermost periphery of the image pickup region CR after reaching the outer peripheral region CRf, a pulse light with a shorter period may be emitted. In the case of the notification using the osseous conduction, as the hand Yh approaches the outermost periphery of the image pickup region CR, a sound with a higher frequency or a sound with a higher volume may be conducted to the middle ear. In addition, the virtual image VI representing a level gauge may be displayed by the AR processing unit 142 and the like, and as the hand Yh approaches the outermost periphery of the image pickup region CR, the level may be increased. As the hand Yh approaches the outermost periphery of the image pickup region CR, the pointer P of the virtual image VI may blink, or the color or shape of the pointer P may be changed. In addition, for the notification, the user can use a device which is provided separately from the head mounted display 100. For example, a control signal is output to the control unit 10 (refer to FIG. 1) and a vibration inducing unit and the like included in a portable terminal (not illustrated), vibration is induced by the control unit 10 and the portable terminal and the like, and a notification is given to the user by this vibration. In this case, as the hand Yh approaches the outermost periphery of the image pickup region CR after reaching the image pickup region CR, vibration with a shorter period may be induced by the portable terminal and the like. The image display unit 20 itself worn on the head may induce vibration.

In the head mounted displays 100 according to the above-described embodiments, unless the hand Yh of the user is recognized as illustrated in FIG. 6 within a predetermined period, only the rectangular frame VIf illustrated in FIG. 11 or the virtual image VI including the rectangular frame VIf may be recognized by the user through the AR processing unit 142 and the like. As a result, the user can reliably recognize the fact that the hand Yh of the user does not enter the image pickup region CR and can be urged to put the hand Yh into the image pickup region CR positioned inside the outer peripheral region CRf. Therefore, the detection accuracy of the hand Yh of the user is increased. Only the rectangular frame VIf illustrated in FIG. 11 or the virtual image VI including the rectangular frame VIf may be triggered to be displayed by a manipulation, for example, a touch manipulation of the user on the touch pad 14.

In addition, in the AR processing unit, an outside scene image obtained by the camera in the visual field direction of the user may be under pattern-matching using a pixel parallactic angle to implement the augmented-reality processing. Specifically, the image display unit includes a right eye camera and a left eye camera. The right eye camera is arranged at a position of the image display unit corresponding to the right eye of the user so as to pick up images of an outside scene in the front direction of the image display unit. The left eye camera is arranged at a position of the image display unit corresponding to the left eye of the user so as to pick up an image of an outside scene in the front direction of the image display unit. The AR processing unit may calculate a deviation amount between a target object (which is a target for displaying additional presentation information around the target) included in the image picked up by the right eye camera and a target object included in the image picked up by the left eye camera and may determine "a target distance", which is a display position of the virtual image VI in the augmented-reality processing, using the deviation amount and the pixel parallactic angle.

The AR processing unit may execute the above-described augmented-reality processing only when predetermined conditions are satisfied. For example, the AR processing unit may execute the above-described augmented-reality processing only when the image display unit has a configuration in which a visual line direction of the user can be detected, and when the detected visual line direction satisfies at least one of the following conditions.

In a viewing angle range in which a horizontal angle is 200° and a vertical angle is 125° (an angle in the down direction is 75° and an angle in the up direction is 50°)

In a viewing angle range in which a horizontal angle is 30° and a vertical angle is 20°, which is an effective visual field where an information receiving capability is superior In a viewing angle range in which a horizontal angle is 60° to 90° and a vertical angle is 45° to 70°, which is a stable point-of-regard field where a point of regard is rapidly and stably observed In a viewing angle range from a horizontal angle of 20°, at which self-motion perception (vection) starts to be induced on an image, to a horizontal angle of 110° at which self-motion perception is saturated In addition, in the above-described embodiments, the camera 61 including the imaging device is used to recognize the hand Yh of the user. However, the image display unit 20 worn on the head may be provided with an ultrasonic sensor, an infrared sensor, an optical sensor, or the like such that the hand of the user can be recognized based on the sensor outputs. Therefore, even when the recognized hand is about to deviate from the image pickup region CR of the camera 61, the notification can be given to the user as described above.

In addition, in the head mounted displays 100 according to the above-described embodiments, when the hand Yh of the user in the image pickup region CR is recognized, the calculation of the difference in pixel value between adjacent pixels to which data is input is executed per pixel included in the camera 61 (Step S102). However, in a peripheral region including a picked-up image of a contour capturing target object which is picked up in the image pickup region CR, the calculation of the difference in pixel value between adjacent pixels may be executed. Alternatively, a difference calculation of data may be performed on colors obtained from pixels in the above peripheral region. In the difference calculation on pixels in the above peripheral region, still images of a cloud, a mountain, a tree, and the like illustrated in FIG. 8 can be excluded from the contour shape capturing target which undergoes the difference calculation. Accordingly, a calculation load is reduced.

The invention is not limited to the above-described embodiments, examples, and modification examples, and various configurations can be made within a range not departing from the scope of the invention. For example, the technical features of the embodiments, the examples, and the modification examples, which correspond to the technical features of each configuration described in "SUMMARY", can be appropriately substituted or combined with other features to solve a part or all the above-described problems or to achieve a part or all the above-described effects. In addition, unless described as being essential in this specification, these technical features may be appropriately deleted.

The entire disclosure of Japanese Patent Application No. 2013-177866, filed Aug. 29, 2013 is expressly incorporated by reference herein.

What is claimed is:

1. A head mounted display apparatus comprising a display in which a virtual image and an outside scene overlap each other and can be visually recognized by a user, the apparatus comprising:
   a processor programmed to:
      generate image data for displaying the virtual image;
      cause the display to allow the user to visually recognize the virtual image such that the virtual image is displayed in a visual field of the user based on the generated image data;
      detect a visual line direction of the user; and
      when the detected visual line direction of the user satisfies at least one viewing angle range condition:
         detect a hand of the user in a predetermined detection region for detecting the hand of the user and detect a behavior of the hand of the user in the detection region; and
         cause a notification to be given to the user based on the detected behavior of the hand of the user, when the hand of the user reaches an outer peripheral region forming an outer periphery of the detection region, wherein the detecting of the hand of the user in the predetermined detection region for detecting the hand of the user and the detecting of the behavior of the hand of the user in the detection region only occur when the detected visual line direction of the user satisfies the at least one viewing angle range condition.

2. The head mounted display apparatus according to claim 1, wherein the processor is further programmed to: cause the display to:
   allow the user to visually recognize the virtual image in a display region corresponding to the detection region, and when the hand of the user is detected in the detection region, generate the image data for displaying the virtual image, which is embedded with a partial hand image corresponding to at least a part of the detected hand of the user, and
   update a position of the partial hand image in the display region of the virtual image based on a position of the part of the hand in the detection region.

3. The head mounted display apparatus according to claim 1, wherein the processor is further programmed to: generate the image data for displaying the virtual image, which is embedded with a frame shape corresponding to the outer peripheral region forming the outer periphery of the detection region, to allow the user to visually recognize the virtual image.

4. The head mounted display apparatus according to claim 1, wherein the processor is further configured to: when the hand of the user is detected in the detection region, generate the image data for displaying a detection-completed image, which indicates the completion of the detection of the hand of the user, as the virtual image or generate the image data for displaying the virtual image, which is embedded with the detection-completed image, to allow the user to visually recognize the virtual image.

5. The head mounted display apparatus according to claim 1, wherein the processor is further programmed to:
   change a form of the notification given to the user as the hand of the user in the detection region approaches the outer periphery of the outer periphery region, and cause the changed notification to be given to the user.

6. The head mounted display apparatus according to claim 5, wherein the processor is further programmed to: as the hand of the user in the detection region approaches the outer periphery of the outer periphery region, execute control such that a sound with a higher frequency than an original frequency of the notification, or a sound with a higher volume than an original volume of the notification is emitted so as to give a changed notification to the user.

7. The head mounted display apparatus according to claim 1, wherein the outer periphery region is a border of the detection region.

8. The head mounted display apparatus according to claim 1, wherein the processor is further programmed to: embed the virtual image with a rectangular frame.

9. The head mounted display apparatus according to claim 8, wherein the rectangular frame corresponds to the outer periphery of the detection region.

10. The head mounted display apparatus according to claim 1, wherein the processor is further programmed to:
   detect a fingertip position, and a distance of the detected fingertip position from an outer periphery of the detection region, and
   when the fingertip position is outside of the detection region, cause the notification to be given to the user.

11. The head mounted display apparatus according to claim 1, wherein the viewing angle range condition includes a horizontal angle condition and a vertical angle condition.

12. The head mounted display apparatus according to claim 1, wherein the processor is further programmed to:
   calculate a difference in pixel value between colors of adjacent pixels represented by input image pickup data;
   group sets of image pickup data in which the calculated difference in pixel value is within a predetermined threshold as a group;
   based on the grouped sets, distinguish regions with a same color system from other regions;
   exclude regions having a contour shape that is less than the size of the hand of the user; and
   compare contour shapes of regions not excluded during a previous hand recognition processing to a contour shape of a region during a present hand recognition processing to determine whether the contour shape has moved or changed.

13. The head mounted display apparatus according to claim 1, wherein the processor is further programmed to: regenerate the image data for forming the virtual image such that a pointer is displayed at converted coordinates of the virtual image.

* * * * *